US012458415B2

(12) United States Patent
Krasovic et al.

(10) Patent No.: US 12,458,415 B2
(45) Date of Patent: Nov. 4, 2025

(54) SYSTEMS AND METHODS FOR CORRECTING SPINAL CURVATURE AND ASSOCIATED INSTRUMENTS

(71) Applicant: NuVasive, Inc., San Diego, CA (US)

(72) Inventors: Michael Krasovic, San Diego, CA (US); Hayden Chun, San Diego, CA (US); Jacqueline M. Bierre, San Diego, CA (US)

(73) Assignee: NuVasive, Inc., San Diego, CA (US)

( * ) Notice: Subject to any disclaimer, the term of this patent is extended or adjusted under 35 U.S.C. 154(b) by 409 days.

(21) Appl. No.: 18/074,090

(22) Filed: Dec. 2, 2022

(65) Prior Publication Data

US 2023/0101502 A1 Mar. 30, 2023

Related U.S. Application Data

(63) Continuation of application No. PCT/US2020/037656, filed on Jun. 14, 2020.

(51) Int. Cl.
*A61B 17/70* (2006.01)
(52) U.S. Cl.
CPC ........ *A61B 17/708* (2013.01); *A61B 17/7032* (2013.01)
(58) Field of Classification Search
CPC .............................. A61B 17/702; A61B 17/708
See application file for complete search history.

(56) References Cited

U.S. PATENT DOCUMENTS

| 9,907,582 B1 | 3/2018 | Olea |
| 2011/0172714 A1* | 7/2011 | Boachie-Adjei ... A61B 17/7076 606/279 |
| 2012/0203279 A1 | 8/2012 | Walters et al. |
| 2012/0283786 A1* | 11/2012 | Rezach ............. A61B 17/7085 606/305 |
| 2013/0245702 A1 | 9/2013 | McBride |
| 2014/0163617 A1 | 6/2014 | Boachie-Adje et al. |
| 2014/0316475 A1 | 10/2014 | Parikh et al. |
| 2019/0380750 A1 | 12/2019 | Morris |

FOREIGN PATENT DOCUMENTS

WO 2021257046 A1 12/2021

OTHER PUBLICATIONS

International Search Report and Written Opinion from PCT/US2020/037656, issued Dec. 23, 2021, 16 pages.

* cited by examiner

*Primary Examiner* — Andrew Yang

(57) ABSTRACT

One aspect of the disclosure relates to vertebral body derotation (VBD) system. In one embodiment, the VBD system includes a first pair of derotation towers and a second pair of derotation towers, a first transverse coupler coupled to the first pair of derotation towers and a second transverse coupler coupled to the second pair of derotation towers, and at least one clamp configured to couple the first and second transverse connectors in the cranial-caudal direction or a first derotation tower of the first pair of derotation towers and a second derotation tower of the second pair of derotation towers in the cranial-caudal direction.

18 Claims, 21 Drawing Sheets

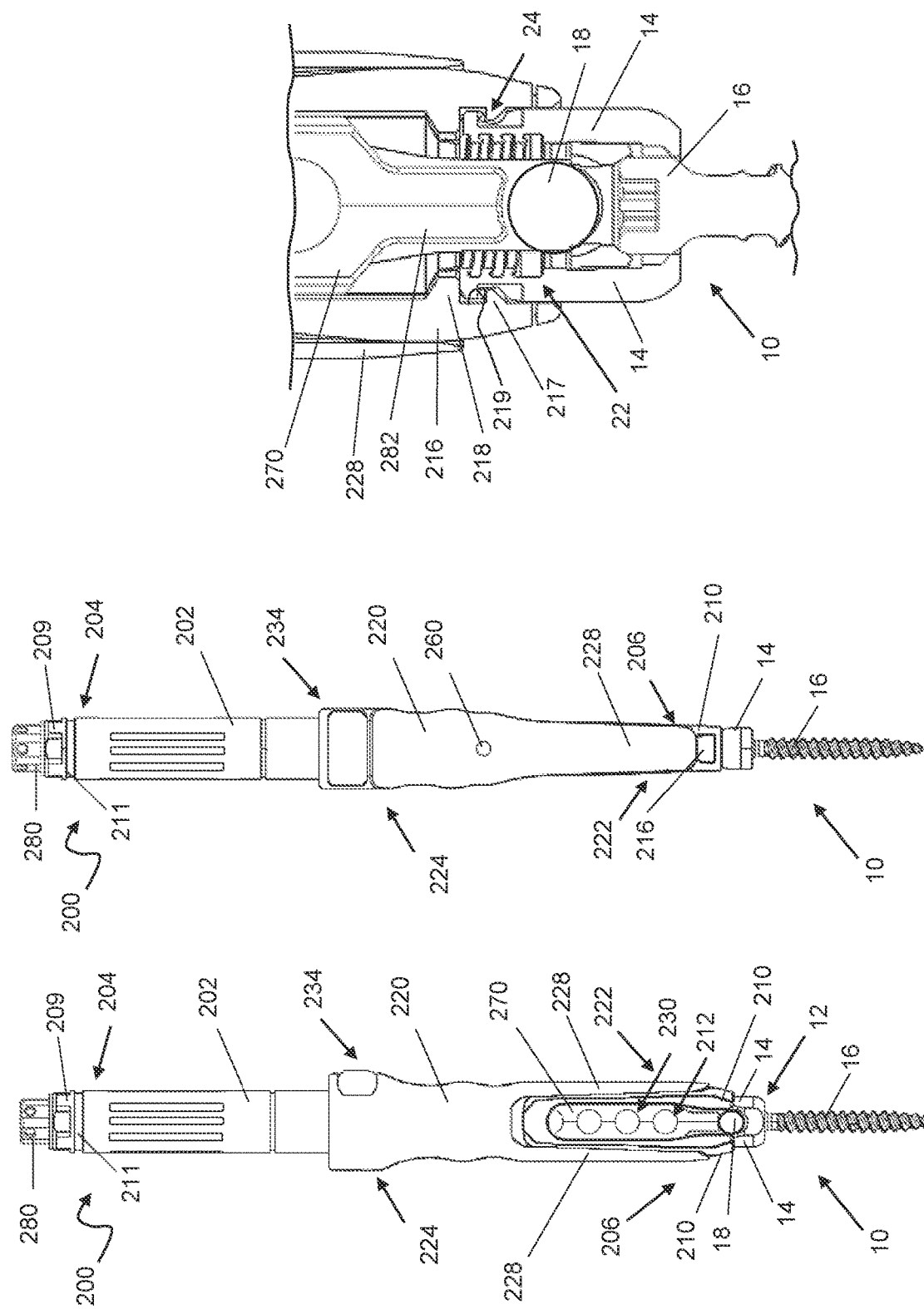

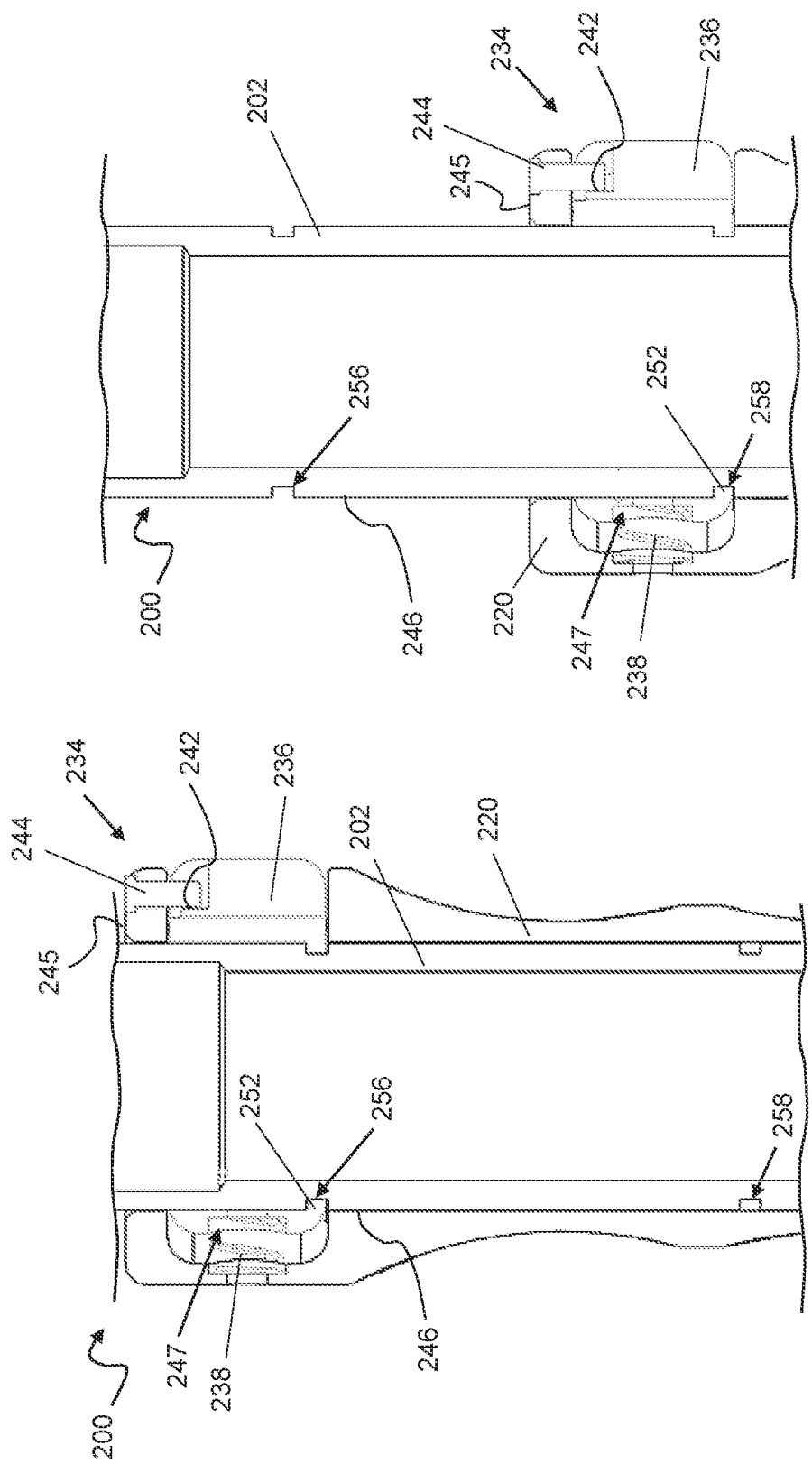

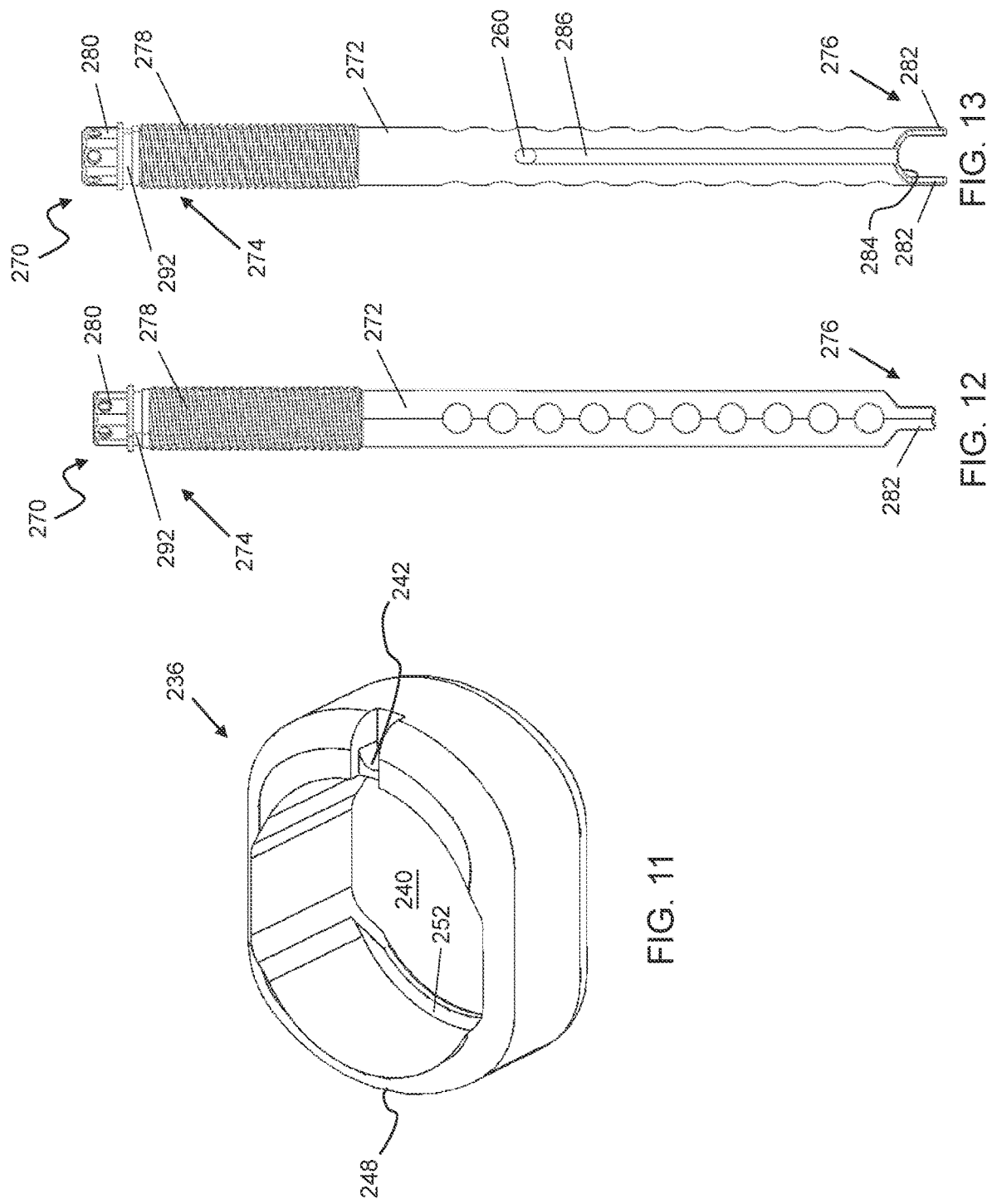

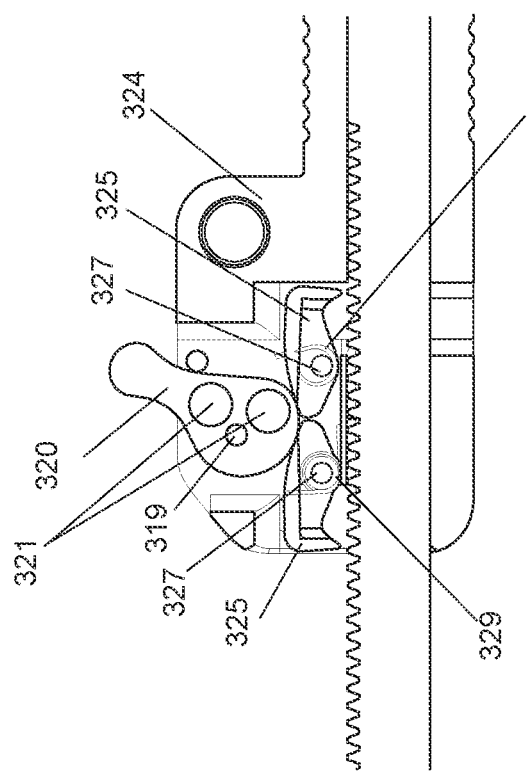
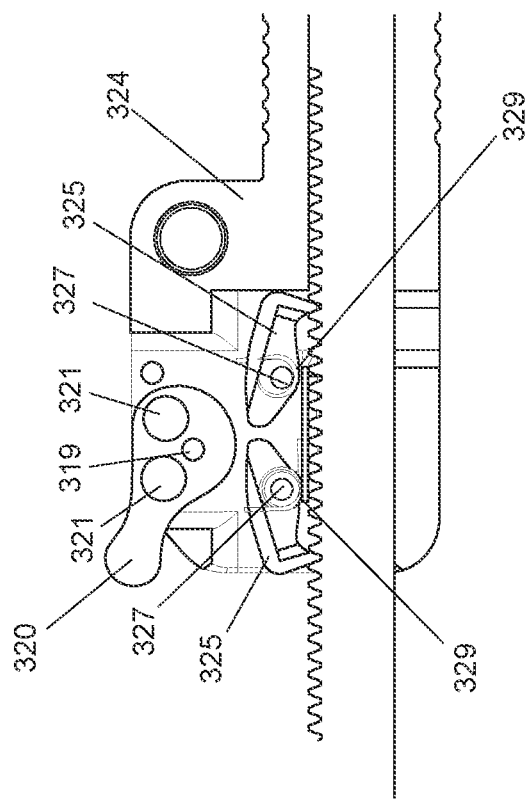

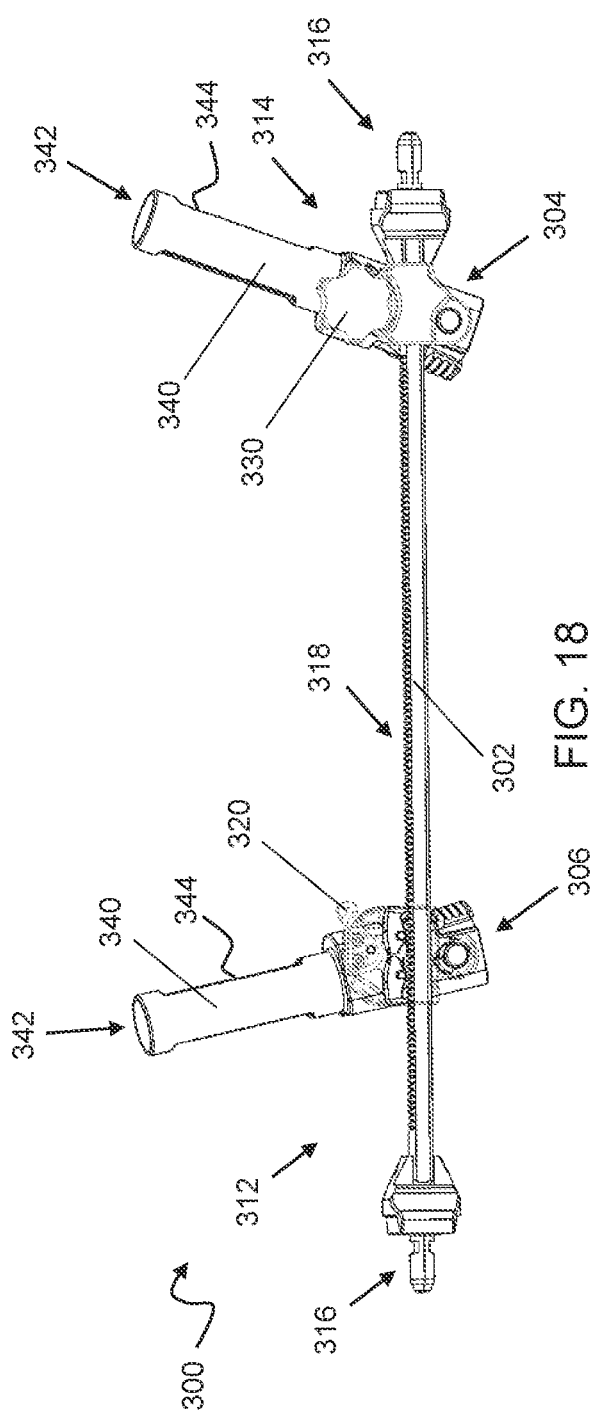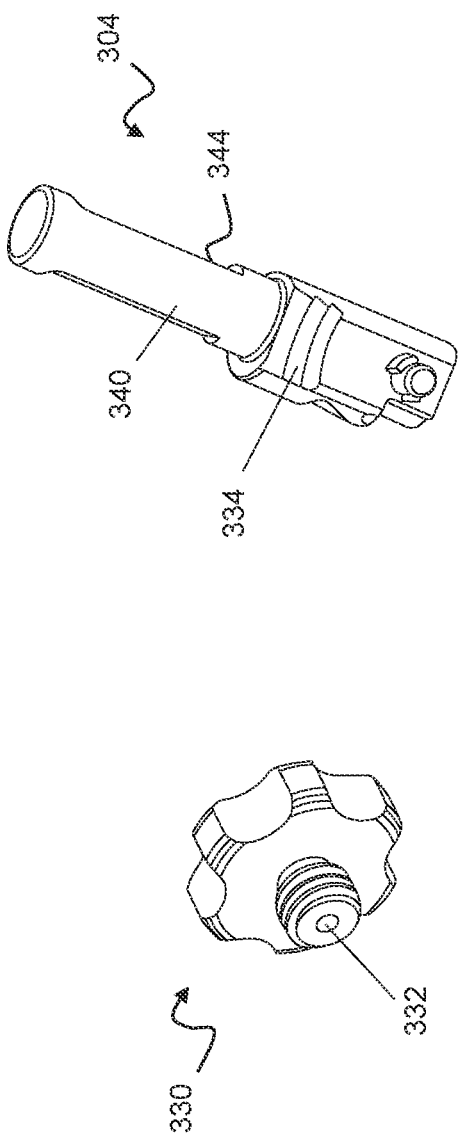
FIG. 18
FIG. 19
FIG. 20

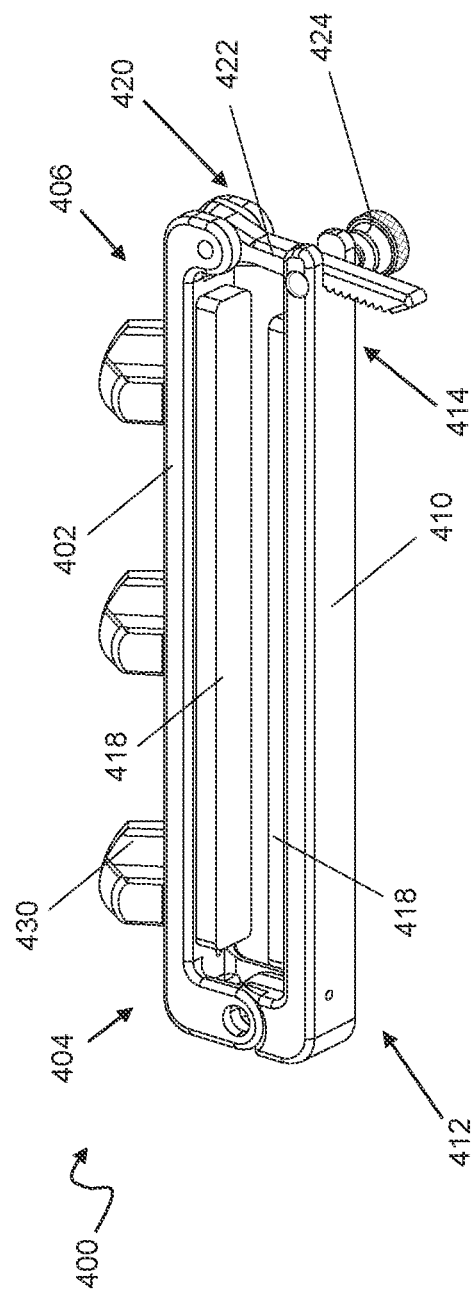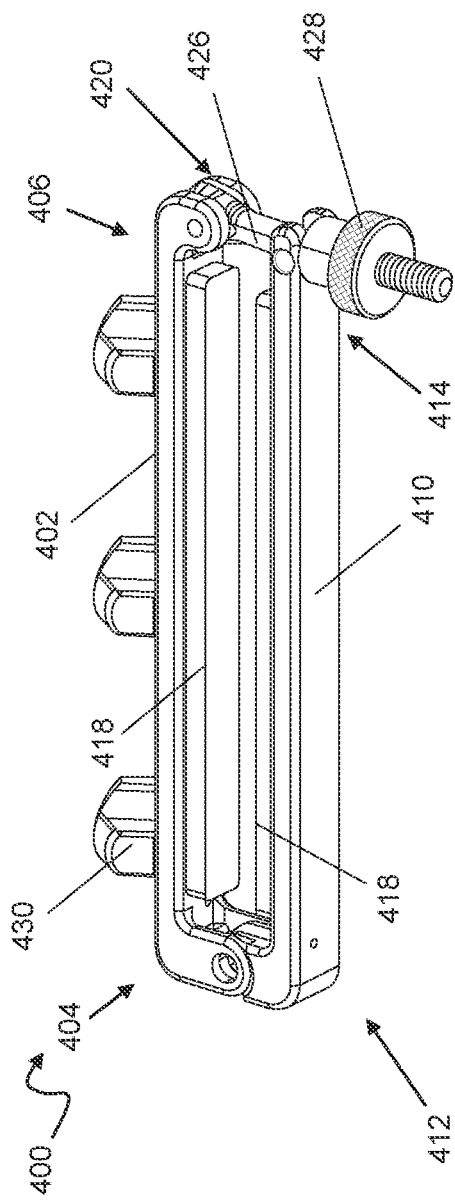

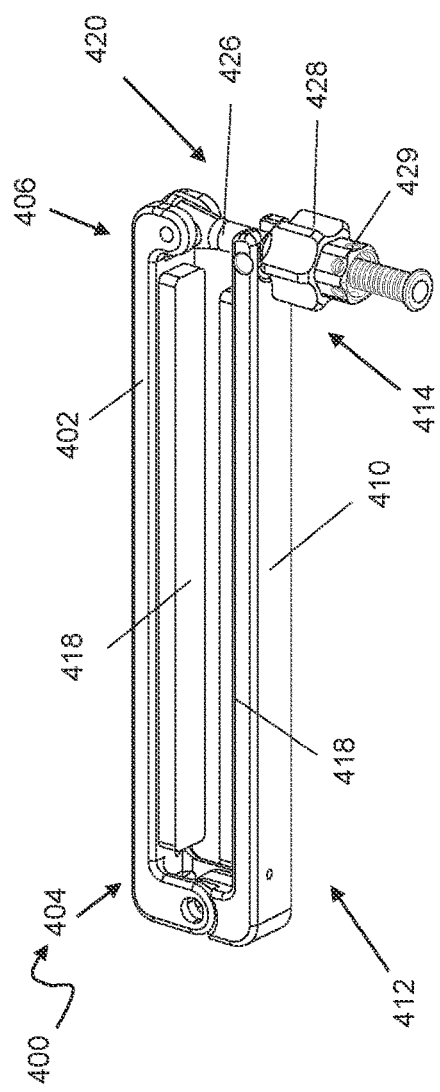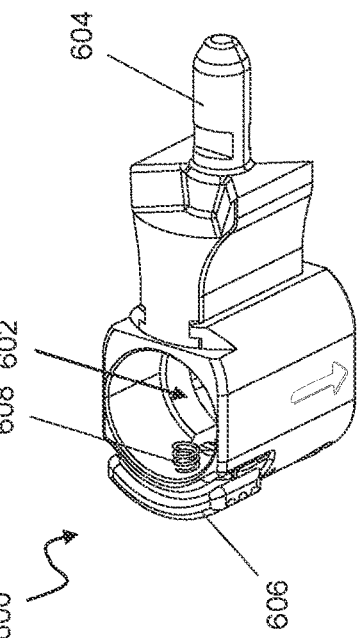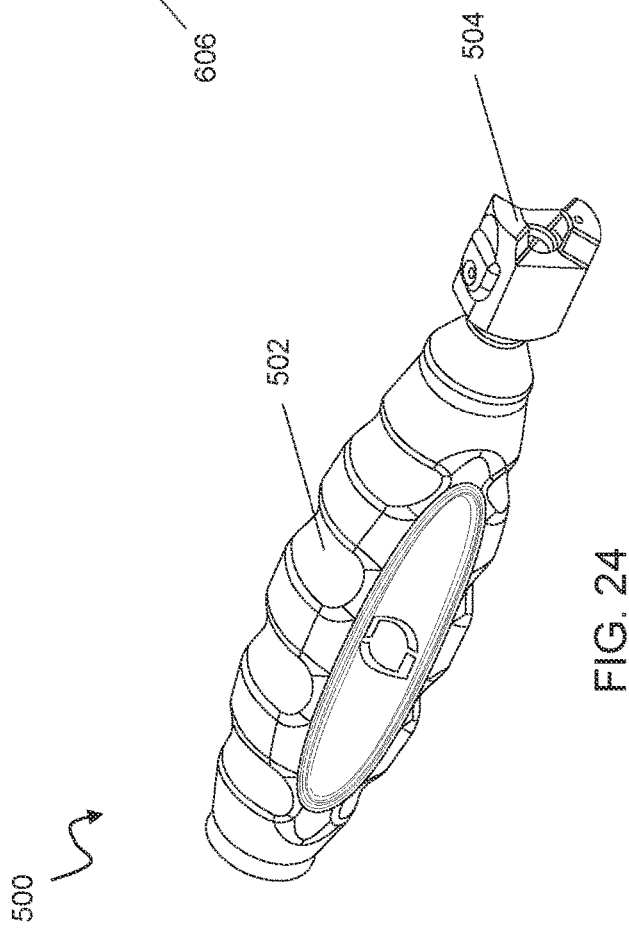

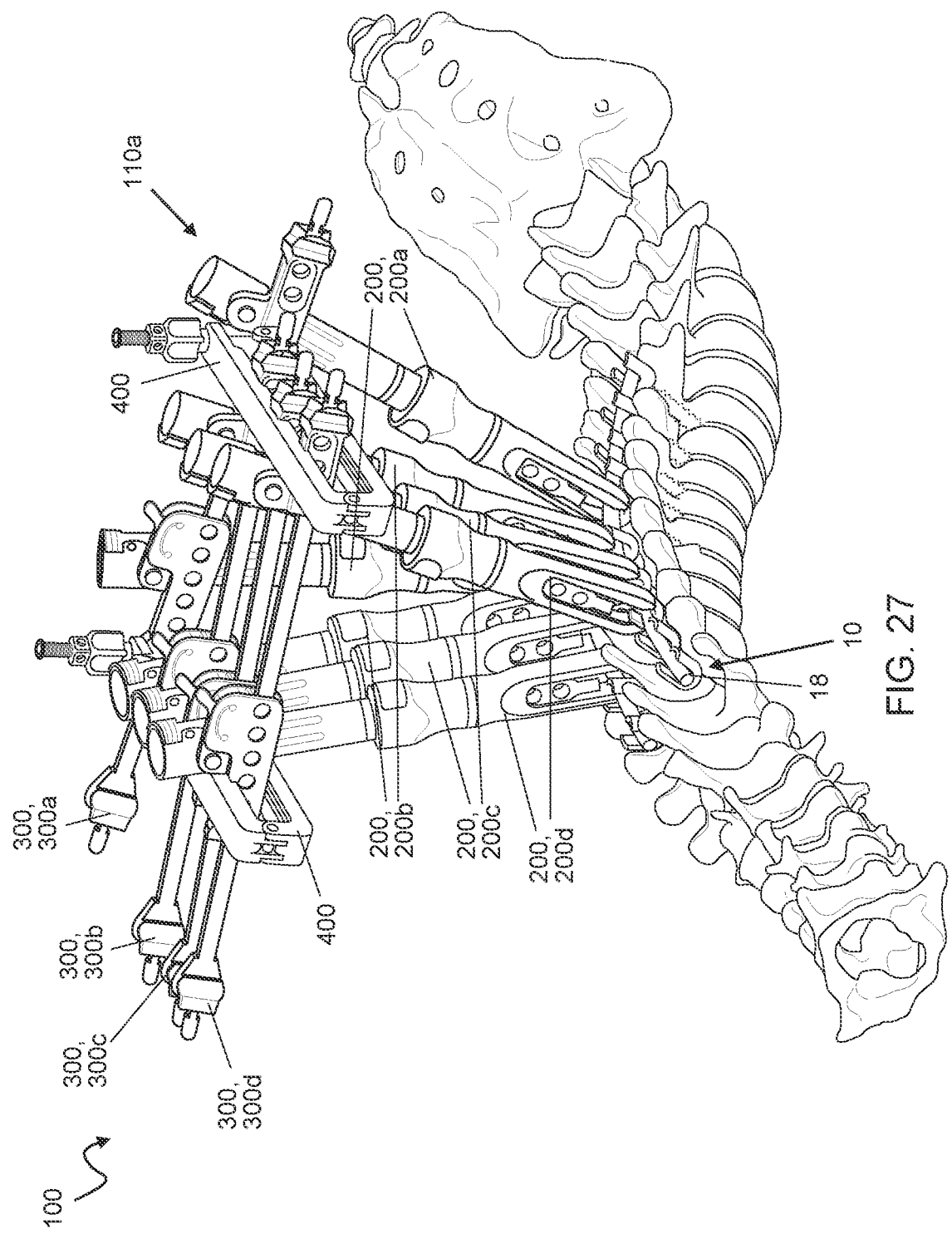

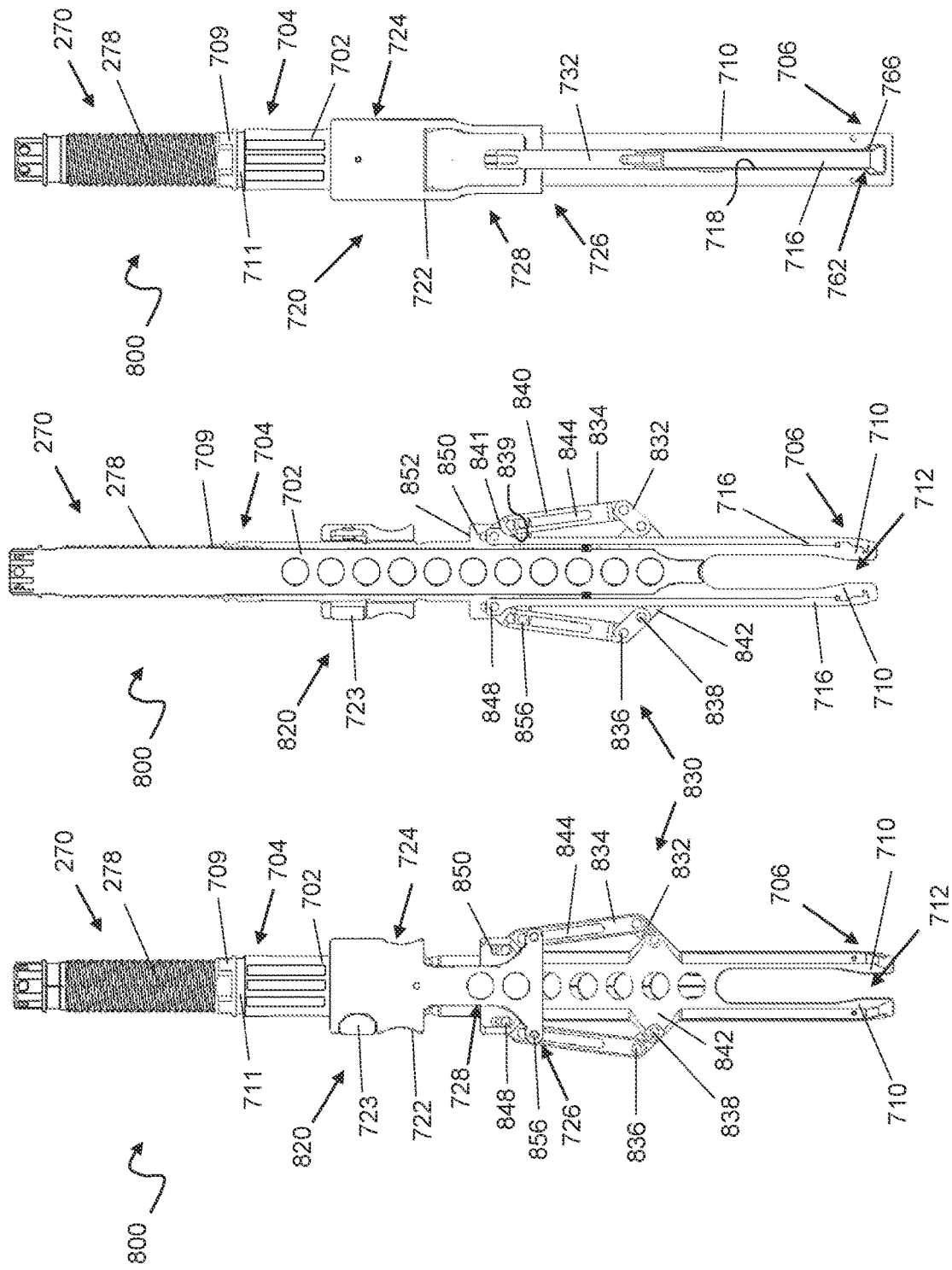

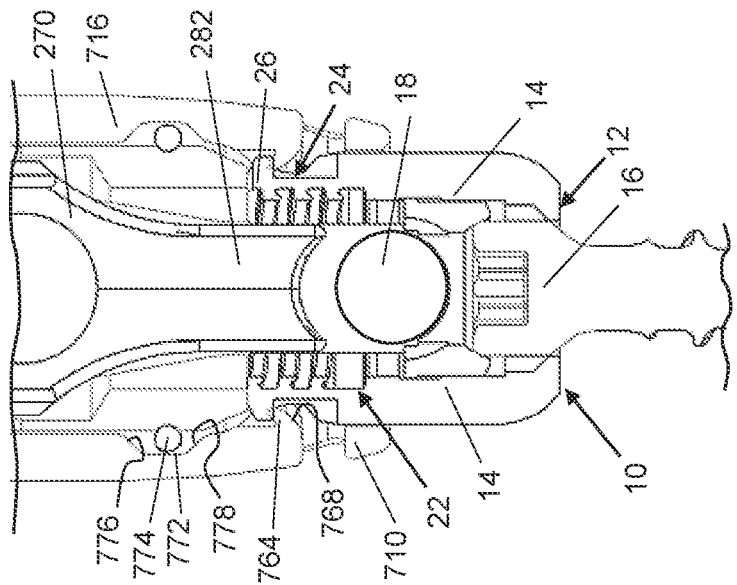
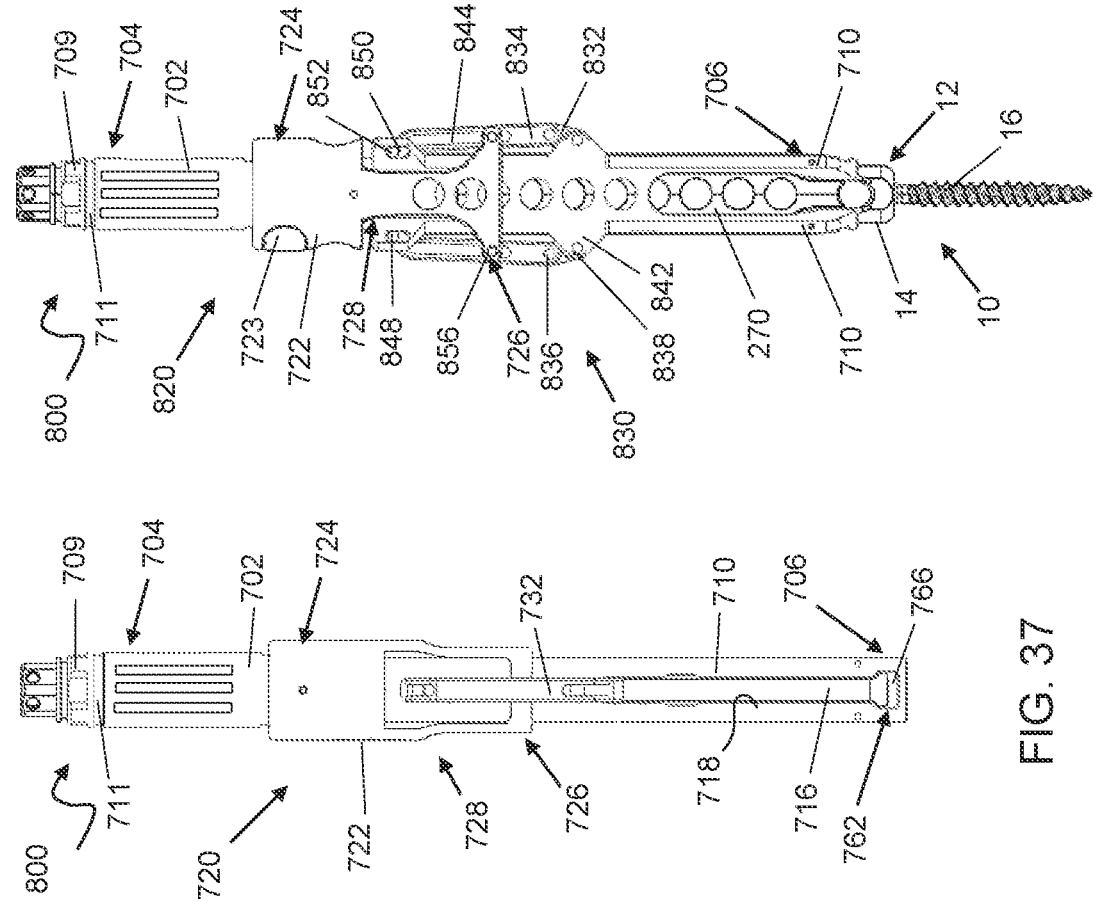
FIG. 39
FIG. 38
FIG. 37

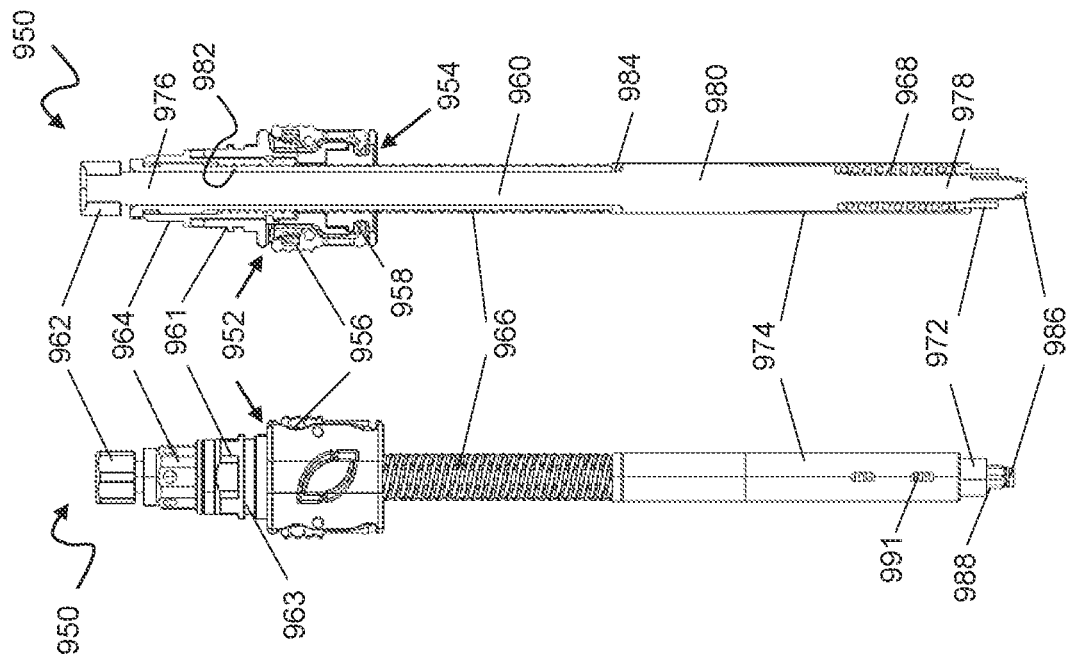
FIG. 42
FIG. 43
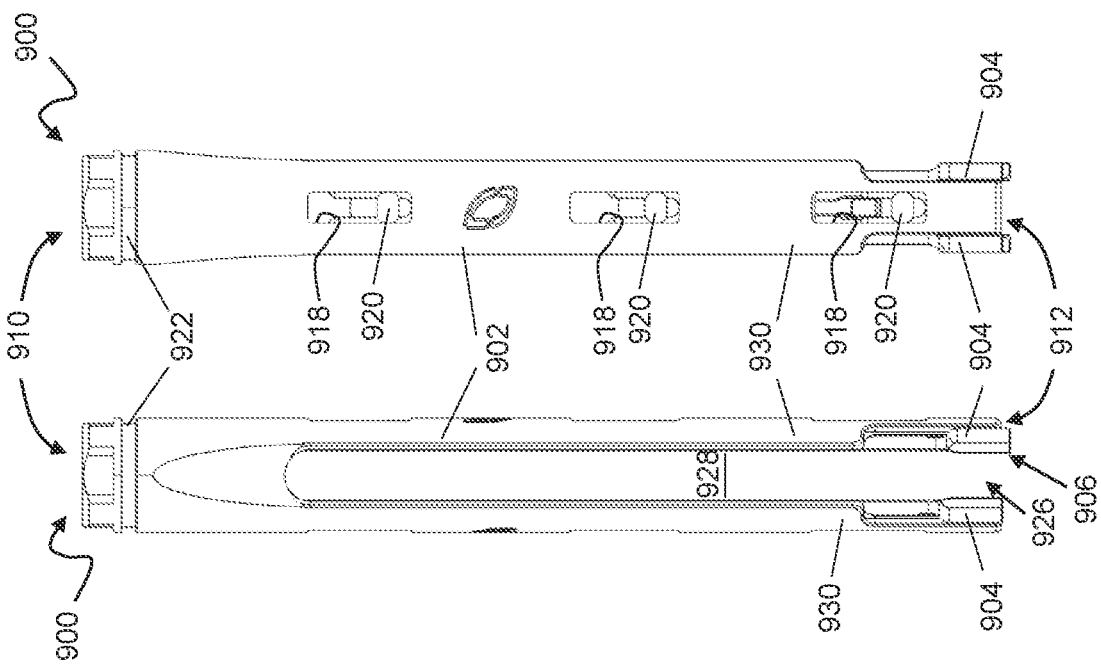
FIG. 40
FIG. 41

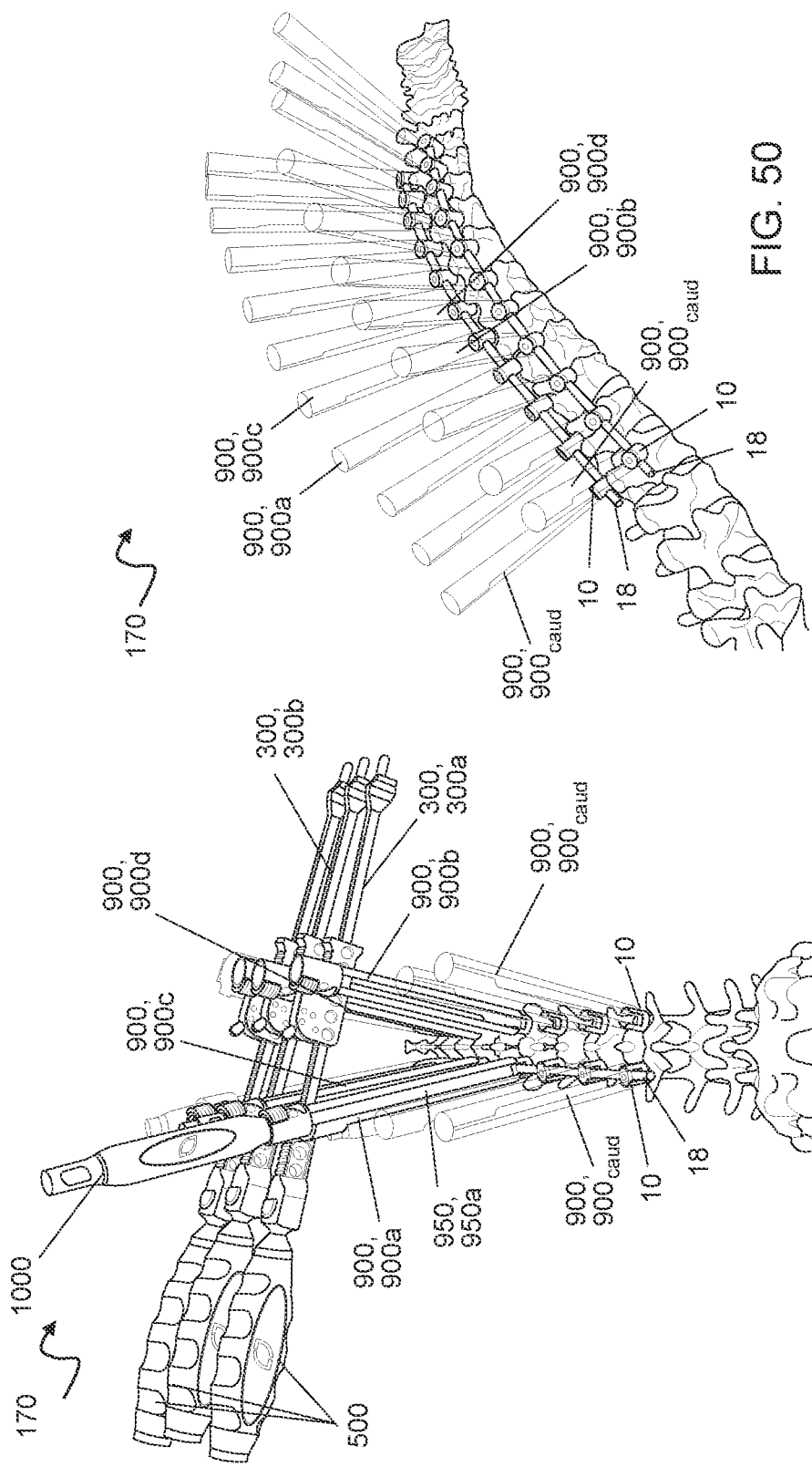

SYSTEMS AND METHODS FOR CORRECTING SPINAL CURVATURE AND ASSOCIATED INSTRUMENTS

CROSS REFERENCE TO RELATED APPLICATIONS

This application is a continuation of PCT Patent Application No. PCT/US2020/037656 filed Jun. 14, 2020, the complete disclosure of which is hereby incorporated by reference into this application as if set forth full herein.

TECHNICAL FIELD

The subject matter described herein relates to systems for correcting spinal curvature and associated instruments and methods.

BACKGROUND

Spinal fixation constructs are utilized to correct curvature of the spine (e.g., the coronal, sagittal, and axial curvature) and to provide stability to the spine. Most often the fixation construct is used as an adjunct to fusion surgery during which adjacent vertebrae are prepared to facilitate bone growth between them. Because motion between the vertebrae tends to inhibit bone growth, the fixation constructs are employed to prevent motion so that bone can grow and achieve a solid fusion. When the position of one or more vertebrae must be adjusted to restore a more natural alignment of the spinal column, the fixation construct also serves to maintain the new alignment until fusion is achieved.

Fixation constructs of various forms are known in the art, of which, rod-based fixation constructs are one of the most common. Typically, in a rod-based construct multiple anchors are coupled to a portion (e.g. the posterior elements) of two or more vertebrae and then connected by a fixation rod. The anchors further include a rod housing in which the fixation rod is captured and locked. The rod housing may be fixed or rotatably coupled to the anchor portion and generally includes a pair of upstanding arms separated by a rod channel. When constructing the fixation construct the surgeon must align and seat the rod in the rod channel of each anchor, an undertaking that is generally referred to as "reduction".

One such condition where the position of one or more vertebrae may need to be adjusted is Adolescent Idiopathic Scoliosis which is an abnormal curvature of the spine. Vertebral body derotation (VBD) may be performed to correct spinal alignment by linking multiple anchors together with instrumentation to drive 3-dimensional correction of the spine. Derotation can be performed on a single vertebral body (segmental) or over multiple vertebrae (en bloc).

SUMMARY

A first aspect of the disclosure relates to a vertebral body derotation system. The vertebral body derotation system can include: a first pair of derotation towers coupled to a first pair of pedicle screws, each pedicle screw of the first pair of pedicle screws on opposing sides of a first vertebral body; a second pair of derotation towers coupled to a second pair of pedicle screws, each pedicle screw of the second pair of pedicle screws on opposing sides of a second vertebral body; a first transverse connector extending across the first vertebral body and coupled to each derotation tower of the first pair of derotation towers; a second transverse connector extending across the second vertebral body and coupled to each derotation tower of the second pair of derotation towers; and at least one clamp configured to couple the first and second transverse connectors in the cranial-caudal direction or a first derotation tower of the first pair of derotation towers and a second derotation tower of the second pair of derotation towers in the cranial-caudal direction.

A second aspect of the disclosure relates to a method for providing correction to an abnormal curvature of a spine. The method may include: providing a first reduction instrument within a first guide assembly, the first guide assembly being coupled to a first bone anchor fixed within a first vertebra; and using the first reduction instrument being coupled with the first guide assembly and first bone anchor to: correct the curvature of the spine in sagittal and coronal planes by reducing a first fixation rod within the first bone anchor, correct rotation of the spine in the axial plane by derotating the first vertebra, and hold sagittal, coronal and axial correction of the spine by delivering a lock screw to lock the first fixation rod within the first bone anchor.

A third aspect of the disclosure relates to a method for providing correction to an abnormal curvature of a spine, the method may include: providing a first guide assembly coupled to a first bone anchor positioned within a first pedicle of a first vertebra; providing a second guide assembly coupled to a second bone anchor positioned within a second pedicle of the first vertebra; providing a third guide assembly coupled to a third bone anchor positioned within a first pedicle of a second vertebra, the third guide assembly being adjacent to the first guide assembly; providing a fourth guide assembly coupled to a fourth bone anchor positioned within a second pedicle of the second vertebra, the fourth guide assembly being adjacent to the second guide assembly; providing a first reduction instrument within the first guide assembly and a second reduction instrument within the third guide assembly; coupling the first and second guide assemblies across the first vertebra using a first transverse coupler; coupling the third and fourth guide assemblies across the second vertebra using a second transverse coupler; simultaneously reducing a first fixation rod within the first bone anchor and manipulating the first transverse coupler to correct alignment of the first vertebra; and simultaneously reducing the first fixation rod within the third bone anchor and manipulating the second transverse coupler to correct alignment of the second vertebra.

A fourth aspect of the disclosure relates to a method for providing correction to an abnormal curvature of a spine. The method may include: providing a first guide assembly coupled to a first bone anchor positioned within a first pedicle of a first vertebra; providing a second guide assembly coupled to a second bone anchor positioned within a second pedicle of the first vertebra; providing a third guide assembly coupled to a third bone anchor positioned within a first pedicle of a second vertebra, the third guide assembly being adjacent to the first guide assembly; providing a fourth guide assembly coupled to a fourth bone anchor positioned within a second pedicle of the second vertebra, the fourth guide assembly being adjacent to the second guide assembly; providing a first reduction instrument within the first guide assembly and a second reduction instrument within the third guide assembly; coupling the first and second guide assemblies across the first vertebra using a first transverse coupler; coupling the third and fourth guide assemblies across the second vertebra using a second transverse coupler; and simultaneously reducing a first fixation rod within the first bone anchor and manipulating the second transverse coupler to correct alignment of the first and second vertebrae.

A fifth aspect of the disclosure relates to a method for providing correction to an abnormal curvature of a spine. The method may include: providing a first guide assembly coupled to a first bone anchor positioned within a first pedicle of a first vertebra; providing a second guide assembly coupled to a second bone anchor positioned within a second pedicle of the first vertebra; providing a third guide assembly coupled to a third bone anchor positioned within a first pedicle of a second vertebra, the third guide assembly being adjacent to the first guide assembly; providing a fourth guide assembly coupled to a fourth bone anchor positioned within a second pedicle of the second vertebra, the fourth guide assembly being adjacent to the second guide assembly; providing a first reduction instrument within the first guide assembly and a second reduction instrument within the third guide assembly; coupling the first and second guide assemblies across the first vertebra using a first transverse coupler; coupling the third and fourth guide assemblies across the second vertebra using a second transverse coupler; sequentially reducing a first fixation rod within the first bone anchor and the second bone anchor; and during the sequentially reducing of the first fixation rod, manipulating the first and second transverse couplers to correct alignment of the first and second vertebrae.

BRIEF DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 6 shows a front side view of the derotation tower of FIG. 3 in a locked position according to embodiments of the disclosure;

FIG. 7 shows side view of the derotation tower according to the embodiments of FIG. 6;

FIG. 8 shows an enlarged cross-sectional view of the distal end of the derotation tower of according to the embodiments of FIG. 6;

FIGS. 9 and 10 show enlarged cross-sectional views of an actuation mechanism according to embodiment of the disclosure in the unlocked position and locked position, respectively;

FIG. 11 shows an enlarged perspective view of the body member of the actuation mechanism according to embodiments of the disclosure;

FIG. 12 shows a front side view of a side of a rod reducer according to embodiments of the disclosure;

FIG. 13 shows a cross-sectional side view of the rod reducer according to embodiments of FIG. 12;

FIG. 16 shows a cross-sectional view of the housing of the adjustable coupler of the transverse coupler in the unlocked position according to embodiments of the disclosure;

FIG. 17 shows a cross-sectional view of the housing of the adjustable coupler of the transverse coupler in the locked position according to embodiments of the disclosure;

FIG. 18 shows a front side view of the transverse coupler according to another embodiment of the disclosure;

FIG. 19 shows a perspective view of a knob of the transverse coupler according to the embodiments of FIG. 18;

FIG. 20 shows a front side view of the stationary coupler of the transverse coupler according to the embodiments of FIG. 18;

FIG. 21 shows a perspective view of a clamp according to embodiment of the disclosure;

FIG. 22 shows a perspective view of the clamp according to another embodiment of the disclosure;

FIG. 23 shows a perspective view of the clamp according to another embodiment of the disclosure;

FIG. 24 shows a perspective view of a manipulating component according to embodiments of the disclosure;

FIG. 25 shows a perspective view of an attachment assembly according to embodiments of the disclosure;

FIG. 27 shows a perspective view of embodiments of the VBD system used for an en bloc VBD technique;

FIG. 34 shows a front side view of a derotation tower in an unlocked position according to an embodiment of the disclosure;

FIG. 35 shows a cross-sectional view of the derotation tower of FIG. 34 according to embodiments of the disclosure;

FIG. 36 shows side view of a derotation tower according to embodiments of FIG. 34;

FIG. 37 shows a side view of the derotation tower of FIG. 34 in a locked position according to embodiments of the disclosure;

FIG. 38 shows a front side view of the derotation tower of FIG. 34 in the locked position according to embodiments of the disclosure;

FIG. 39 shows an enlarged cross-sectional view of the distal end of the derotation tower of FIG. 38;

FIG. 40 shows a front side view of a guide assembly according to embodiments of the disclosure;

FIG. 41 shows a side view of the guide assembly of FIG. 40 according to embodiments of the disclosure;

FIG. 42 shows a front side view of a reduction instrument according to embodiments of the disclosure;

FIG. 43 shows a cross-sectional view of the reduction instrument of FIG. 42;

FIG. 49 shows the vertebral body derotation system on the spine after alignment has been corrected according to an embodiment of the disclosure; and FIG. 50 shows a perspective view of a spine after alignment has been corrected and placement of a second fixation rod.

Figure 1:
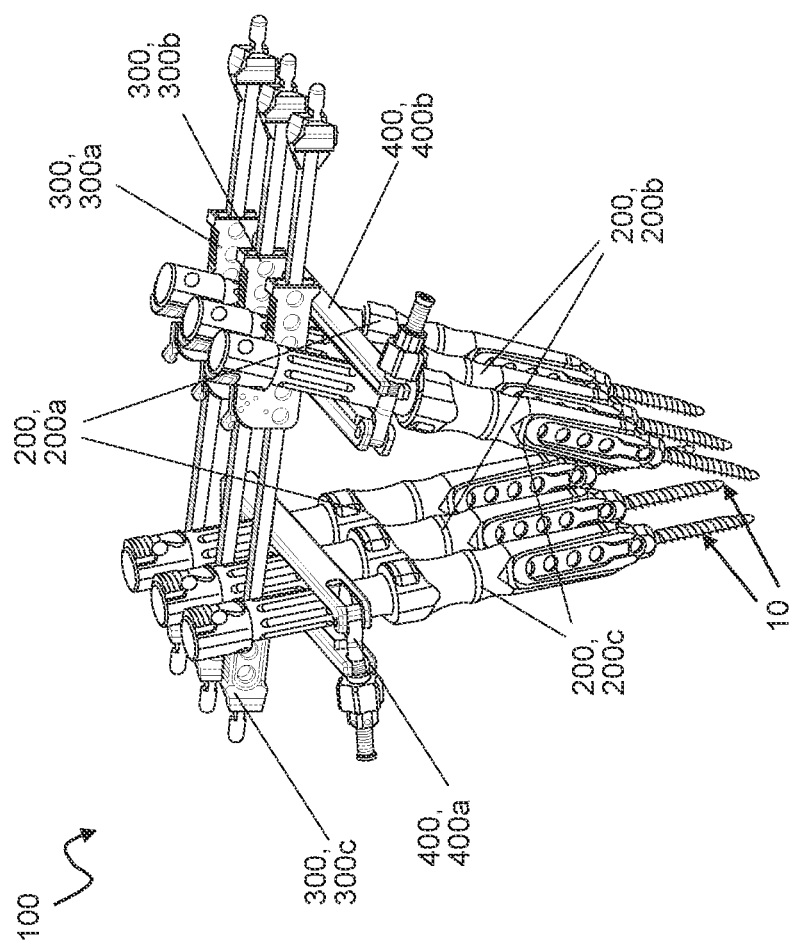
FIG. 1 shows a perspective view of a vertebral body derotation (VBD) system according to embodiments of the disclosure.

It is noted that the drawings of the subject matter are not necessarily to scale. The drawings are intended to depict only typical aspects of the subject matter, and therefore, should not be considered as limiting the scope of the disclosed subject matter. In the drawings, like numbering represents like elements between the drawings.

DETAILED DESCRIPTION

Vertebral body derotation (VBD) may be performed to correct spinal alignment by linking multiple anchors together with instrumentation to drive 3-dimensional correction of the spine. Derotation can be performed on a single vertebral body (segmental) or over multiple vertebrae (en bloc). The instrumentation, systems and methods herein can be used to perform both segmental and en bloc VBD techniques for providing correction to an abnormal spinal curvature caused by adolescent idiopathic scoliosis and degenerative scoliosis.

Figure 2:
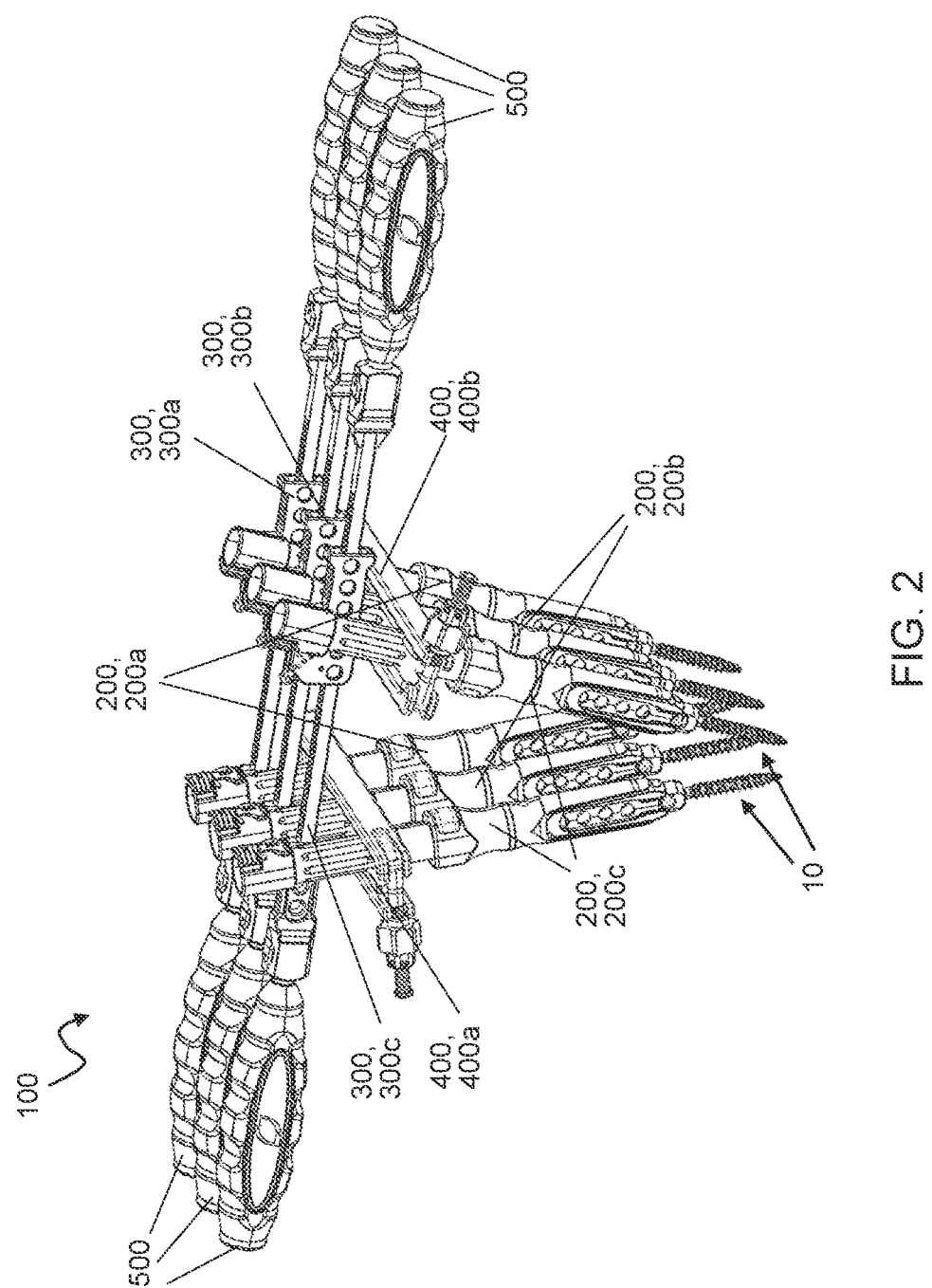
FIG. 2 shows a perspective view of the VBD system with manipulating components according to embodiments of the disclosure.

The present disclosure describes various embodiments of systems for correcting an abnormal curvature of the spine, which in some cases can include a VBD system. FIGS. 1-2 show a VBD system 100 according to embodiments of the disclosure. As shown, the VBD system 100 includes a set of derotation towers 200, one or more transverse couplers 300, and at least one clamp 400 (which may be used for en bloc techniques). Further, the VBD system 100 may optionally include one or more manipulating components 500 (FIG. 2). The VBD system 100 may be used to correct or derotate one or more rotated vertebrae of a subject's (e.g., a patient) spine. Specifically, the VBD system 100 may be configured to couple to a set of bone anchors 10 implanted within the subject's spine, and once coupled, used to manipulate the rotated vertebrae into a substantially aligned position.

The VBD system 100 can be used with any now known or later developed bone anchors. One example of a bone anchor is shown in FIGS. 6-8. The bone anchor 10 may be a bone screw suitable for stable fixation to vertebral bone (e.g. pedicle or vertebral body). The bone anchor 10 may also include other fixation devices, e.g. hooks, staples, clamps, etc. (not shown). The bone anchor 10 can include a receiver 12 having two opposing upright arms 14 defining a rod channel therebetween and an anchor portion 16. The anchor portion 16 is configured to be implanted or fixated directly into the vertebral bone. The receiver 12 with upright arms 14 is configured to receive a fixation rod 18 (FIGS. 6 and 8) therein. The receiver 12 can be fixedly attached to the anchor portion 16 or may be coupled such that the receiver 12 can rotate in one or more directions (e.g., uniplanar, polyaxial, etc.). The receiver 12 also includes a mechanism 22 (FIG. 8) to lock the fixation rod 18 in position in the rod channel. For example, the mechanism 22 may include a locking cap guide and advancement feature disposed on the interior face of each upright arm 14 that interacts with a complementary feature on a locking cap or lock screw (not shown). The receiver 12 also includes one or more instrument engagement features 24, e.g., attachment grooves, for releasably coupling to one or more instruments during implantation. Another example of a bone anchor configured for use with the VBD system 100 described herein is shown and described in U.S. Pat. No. 9,198,698, filed Apr. 25, 2012, the entire contents of which are incorporated herein by reference as if set forth in its entirety.

Figure 3:
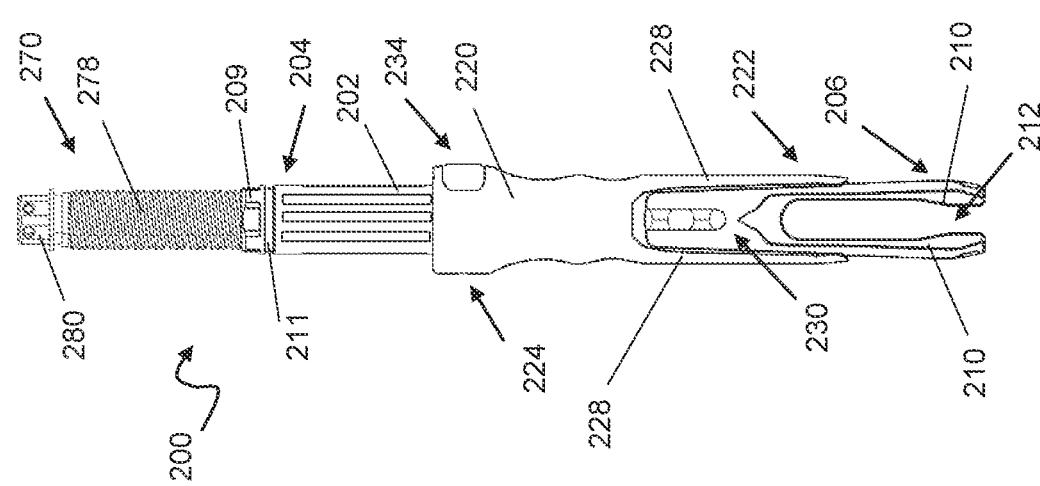
FIG. 3 shows a front side view of a derotation tower in an unlocked position according to an embodiment of the disclosure.
Figure 4:
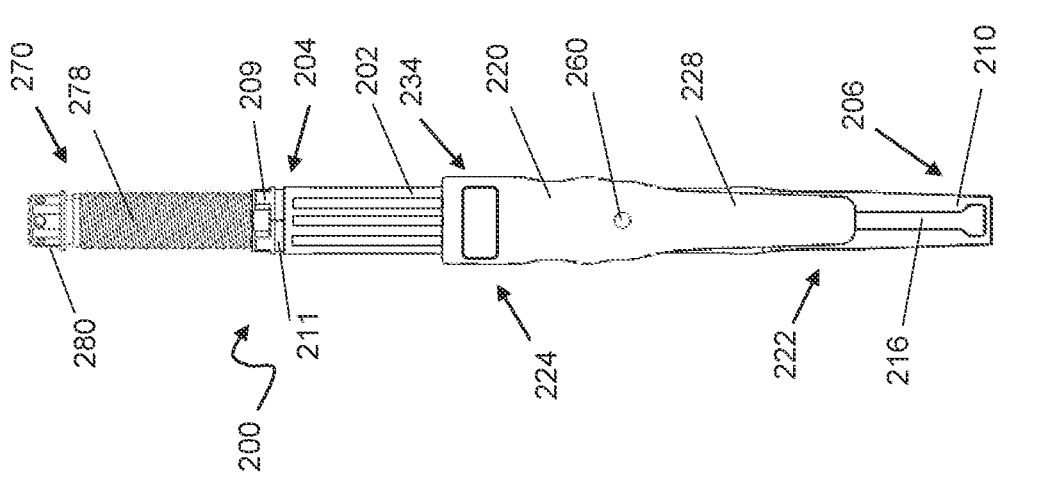
FIG. 4 shows side view of the derotation tower according to the embodiments of FIG. 3.
Figure 5:
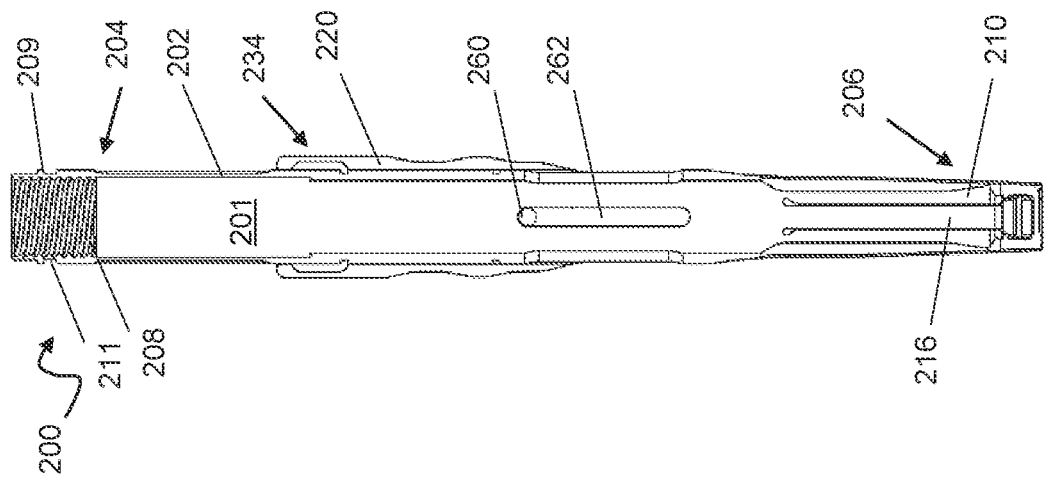
FIG. 5 shows a cross-sectional view of the derotation tower according to the embodiments of FIG. 4 without a rod reducer therein.

Turning now to FIGS. 3-8, a first embodiment of a derotation tower 200 is shown. In this embodiment, the derotation tower 200 includes an inner elongate member 202 having a proximal end 204 and a distal end 206. The inner elongate member 202 includes an inner lumen 201 (FIG. 5) extending the length of the inner elongate member 202 to allow passage of other surgical instruments therein, e.g., a rod reducer 270 (FIGS. 3-4 and 6-8). Thus, the inner elongate member 202 may be substantially tubular in shape in some embodiments. As used herein, "substantially" refers to largely, for the most part, entirely specified or any slight deviation which provides the same technical benefits of the disclosure. The proximal end 204 of the inner elongate member 202 may include a thread 208 (FIG. 5) on an inner surface thereof and a head 209 sized and shaped to allow coupling of the derotation tower 200 with another instrument, e.g., the transverse coupler 300 (FIGS. 14-5 and 18) and/or the derotation tower attachment assembly 600 (FIG. 25). The head 209 may be keyed to prevent rotation of the derotation tower 200 relative to the instrument coupled thereto. The proximal end 204 of the inner elongate member 202 may also include a circumferential groove 211 distal to the head 209. As will be described herein, the thread 208 may be configured to thread with the rod reducer 270. The distal end 206 of the inner elongate member 200 includes a pair of opposing extensions 210 separated by a channel 212 (FIGS. 3 and 6) extending therebetween. The opposing extensions 210 are configured to engage the receiver 12 (FIGS. 6-8) of the bone anchor 10 (FIGS. 6-8) as will be described herein. Further, the channel 212 is configured to receive a fixation rod, e.g., the fixation rod 18 (FIGS. 6 and 8) therethrough as will be described herein. As shown in FIGS. 4-5, each of the opposing extensions 210 includes a deflectable portion or spring arm (hereinafter, "deflectable portion") 216 formed within a longitudinal recess therein. Each longitudinal recess is dimensioned to receive the length of the deflectable portion 216 therein which helps reduce the lateral profile of the derotation tower 200. Each deflectable portion 216 includes ridges 217, 218 (FIG. 8) extending within lateral openings (not shown) at the distal end 206 of the derotation tower 200. The lateral openings are adapted to allow passage of the ridges 217, 218 of the deflectable portions 216 to enable the ridges 217, 218 to engage the receiver 12.

The derotation tower 200 also includes an outer sleeve 220 disposed over at least a portion of the inner elongate member 202. The outer sleeve 220 includes a distal end 222 and a proximal end 224. Like the distal end 206 of the inner elongate member 202, the distal end 222 of the outer sleeve 220 may include a pair of opposing extensions 228 separated by a channel 230 (FIGS. 3 and 6). The outer sleeve 220 may be configured to slide relative to the inner elongate member 202 between an unlocked position (FIGS. 3-5) and a locked position (FIGS. 6-8) such that in the unlocked position, the derotation tower 200 is configured to be engaged with and unengaged with the receiver 12 of the bone anchor 10 by application of force by a user, e.g., a medical professional, surgeon, etc. In the locked position, the derotation tower 200 is configured to be locked to the receiver 12 of the bone anchor 10 such that the derotation tower 200 cannot be removed from the bone anchor 10 upon application of force by the user until the derotation tower 200 transitions into the unlocked position. In the locked position, there is limited toggle between the derotation tower 200 and the bone anchor 10 such that manipulation of the derotation tower 200 by application of force by the user is translated to manipulation of the bone anchor 10, and thus, to the vertebral body of which the bone anchor 10 is fixed.

In the locked position, the pair of opposing extensions 228 of the outer sleeve 220 are disposed over the pair of opposing extensions 210 of the inner elongate member 202. The extensions 228 of the outer sleeve 220 cause the deflectable portion 216 of each extension 210 of the inner elongate member 202 to deflect inwardly toward a longitudinal axis of the inner elongate member 202. Upon removal of the extensions 228 from over the deflectable portion 216, e.g., by transitioning the derotation tower 200 from the locked to the unlocked position, the deflectable portions 216 return and/or spring back to their resting state such that the deflectable portions 216 move in a slight outward direction relative to the longitudinal axis of the inner elongate member 202. As shown in FIG. 8, the deflectable portion 216 includes a pair of ridges 217, 218 and a groove 219 therebetween that is configured to mate and/or engage with the instrument engagement features 24 of the bone anchor 10. Further, in this position, the channel 230 of the outer sleeve 220 is substantially aligned with the channel 212 of the inner elongate member 202 such that the fixation rod 18 can extend within channels 212, 230 between extensions 210, 228. In the unlocked position, the extensions 228 of the outer sleeve 220 are not disposed over a substantial portion of extensions 210 of inner elongate member 202, and therefore, are not disposed over a substantial portion of the deflectable portion 216. Thus, the deflectable portion 216 is not caused to be deflected inward toward the longitudinal axis of the inner elongate member 202 in the unlocked position. Since the deflectable portion 216 is not held in a deflected inward position by the extensions 228 in the unlocked position, the derotation tower 200 can be lifted off of the receiver 12 by application of some force by the user such that the deflectable portion 216 disengages from the receiver 12.

Upon engagement of the derotation tower 200 to the receiver 12 of the bone anchor 10, the user may transition the derotation tower 200 from the unlocked position to the locked position such that the derotation tower 200 cannot easily be removed from the receiver 12. The derotation tower 200 may transition from the unlocked position to the locked position (and vice versa) via an actuation mechanism 234 such as, for example, a spring-loaded button push and release mechanism. As shown in FIGS. 9-10, the actuation mechanism 234 may be at least partially disposed within the proximal end 224 of the outer sleeve 220 and at least partially surround the inner elongate member 202. The actuation mechanism 234 may include a body member 236 and a biasing member 238. The body member 236 may be substantially cylindrical in shape and include a central lumen 240 (FIG. 11) through which the inner elongate member 202 is configured to extend. At least a portion of the body member 236 is exposed through the outer sleeve 220 such that the outer sleeve 220 includes an opening or cutout that exposes a portion of the body member 236 that can be engaged by the user. The body member 236 may also include an abutment surface 242 configured to engage with a stop 244 disposed within the outer sleeve 220. The stop 244 may include, for example, a projection, protrusion, a pin, protuberance, a bulge, or any other feature capable of engaging the abutment surface 242 and prevent the abutment surface 242 from moving outwardly past the stop 244. In one example (shown), the stop 244 can extend through an end surface 245 (FIGS. 9-10) of the proximal end 224 of the outer sleeve 220. In other embodiments, the stop 244 can be integrated with the outer sleeve 220. The biasing member 238 is configured to bias the body member 236 against an outer surface 246 of the inner elongate member 202 and extends through a recess 247 disposed within an outer surface 248 of the body member 236 on an opposing side of the body member 236 relative to the abutment surface 242. Thus, the biasing member 238 also biases the abutment surface 242 of the body member 236 against the stop 244. Further, the body member 236 may include a ledge 252 extending from the inner surface 248 partially into the central lumen 240. The ledge 252 is configured to mate with a proximal cutout 256 and a distal cutout 258 that are formed within the inner elongate member 202. In this way, the ledge 252 helps maintain a position of the actuation mechanism 234 (and thus the outer sleeve 220) relative to the inner elongate member 202. The proximal cutout 256 may be configured to maintain the derotation tower 200 in the unlocked position whereas the distal cutout 258 may be configured to maintain the derotation tower 200 in the locked position.

To transition the derotation tower 200 from the unlocked position to the locked position, the body member 236 may be engaged by a user to control the actuation mechanism 234 (and thus act similarly to a button). The user engages the body member 236 and pushes the body member 236 inwardly toward a longitudinal axis of the derotation tower 200 such that the abutment surface 242 disengages from the stop 244 and the ledge 252 is displaced from proximal cutout 256. As a result, the outer sleeve 220 can slide along a length of the inner elongate member 202 between the unlocked and the locked positions. The outer sleeve 220 may slide distally until the ledge 252 engages the distal cutout 258. A snap or click may be felt thereby providing tactile feedback to the user that the ledge 252 is positioned within the distal cutout 258. Additionally, at this time, the abutment surface 242 reengages the stop 244 and the body member 236 (and outer sleeve 220) is locked in place relative to the inner elongate member 202. To transition the derotation tower 200 from the locked position to the unlocked position, e.g., to remove the derotation tower 200 from the bone anchor 10, the user may again engage the body member 236 and push the body member 236 inward toward a longitudinal axis of the derotation tower 200 such that the abutment surface 242 disengages from the stop 244 and the ledge 252 is displaced from the distal cutout 258. As a result, the outer sleeve 220 can again slide along a length of the inner elongate member 202 between the locked and unlocked positions. The outer sleeve 220 may be moved in a proximal direction until the ledge 252 engages the proximal cutout 256. A snap or click may be felt thereby providing tactile feedback to the user that the ledge 252 is positioned within the proximal cutout 256. Additionally, at this time, the abutment surface 242 reengages the stop 244 and the body member 236 (and outer sleeve 220) is locked in place relative to the inner elongate member 202.

The outer sleeve 220 may be prevented from rotational movement about the inner elongate member 202. In one example, a projection, protrusion, guide pin, protuberance, a bulge, etc. (hereinafter, "projection") 260 (FIGS. 4-5 and 7) may extend through the outer sleeve 220 and through a longitudinal opening, slot, or recess (hereinafter, "longitudinal opening") 262 (FIG. 5) formed within the inner elongate member 202. In one embodiment, a pair of projections 260 may extend through opposing sides of the derotation tower 200 through the outer sleeve 220 and through a pair of longitudinal openings 262 that are formed on opposing sides of the inner elongate member 202. The projection(s) 260 may be in a fixed position relative to the outer sleeve 220 but may be slidingly moveable within the longitudinal opening(s) 262 of the inner elongate member 202 when the outer sleeve 220 slides relative to the inner elongate member 202 between unlocked and locked positions. In some embodiments, the projection(s) 260 may be formed as part of or integrated with the outer sleeve 220 such as a projection extending from an inner surface the outer sleeve 220. In other embodiments, the projection(s) 260 may be a separate component that extends through apertures formed within the outer sleeve 220. While not shown, it is also understood a projection may be disposed on an outer surface of the inner elongate member 202 and extend through a slot or recess formed within the outer sleeve 220 in alternative embodiments. As a result of the projection(s) 260 being slidingly disposed with the longitudinal opening(s) 262, outer sleeve 220 is prohibited from rotating about the inner elongate member 202.

FIGS. 12-13 show a rod reducer 270 according to aspects of the disclosure. The rod reducer 270 is configured to be inserted within the proximal end 204 of the inner elongate member 200. As shown, the rod reducer 270 may include an elongate shaft 272 having a proximal end 274 and a distal end 276. The proximal end 274 may have threads 278 on an outer surface thereof and a head 280 sized and shaped to be coupled with other surgical instruments. The threads 278 are configured to threadingly engage with the inner threads 208 of the proximal end 204 of the inner elongate member 202. The distal end 276 of the rod reducer 270 includes a pair of capture arms 282 separated by a surface 284 shaped (e.g., concave) for engaging the fixation rod 18 (FIGS. 6 and 8). Upon rotation of the rod reducer 270 in a first direction, the rod reducer 270 translates in a distal direction relative to the inner elongate member 202 to reduce the fixation rod 18 within receiver 12 (FIGS. 6-8) of the anchor 10 (FIGS. 6-8). Upon rotation of the rod reducer 270 in a second direction, the rod reducer 270 translates in a proximal direction relative to the inner elongate member 202. The rod reducer 270 is prevented from actual rotation relative to the inner elongate member 202 and instead merely translates relative to the inner elongate member 202 due to rod reducer 270 having a longitudinal opening 286 therein for receiving projection 260. Like inner elongate member 202, in some embodiments, the rod reducer 270 may have opposing longitudinal openings 286 formed within opposing sidewalls to engage with a pair of opposing projections 260.

Figure 14:
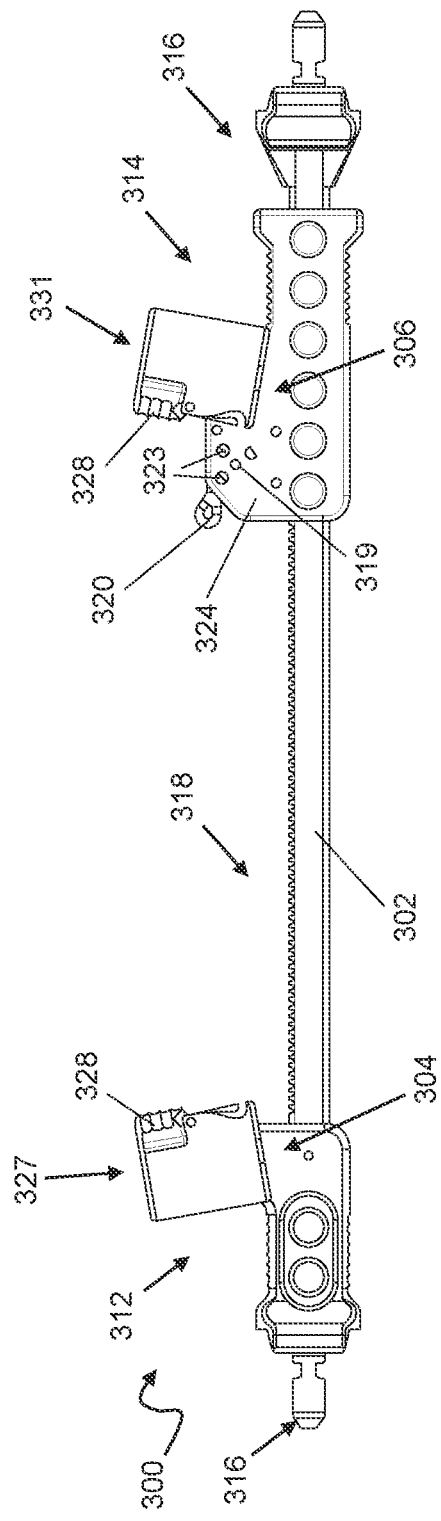
FIG. 14 shows a front side view of the transverse coupler according to embodiments of the disclosure.
Figure 15:
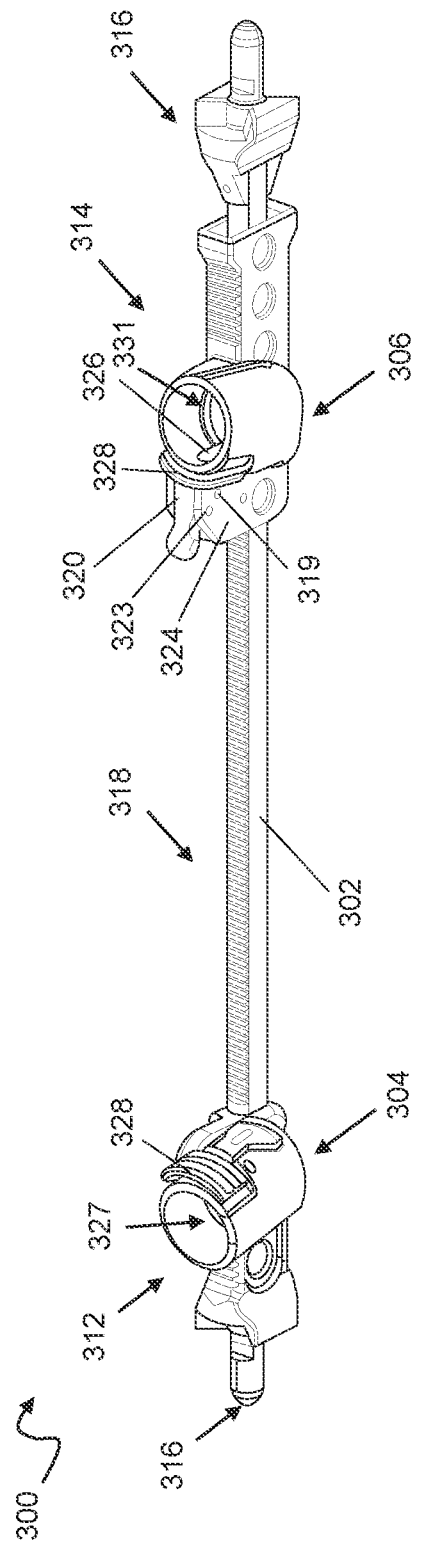
FIG. 15 shows a perspective view of the transverse coupler according to embodiments of the disclosure.

FIGS. 14-15 show the transverse coupler 300 according to embodiments of the disclosure. The transverse coupler(s) 300 can be used to couple instruments, e.g., derotation towers 200 (FIGS. 3-7), 700 (28-32), 800 (34-38), guide assemblies 900 (FIGS. 40-41) and/or reduction instruments 950 (FIGS. 42-43), on opposing sides of the spine. More specifically, each transverse coupler 300 couples instruments on opposing sides of the same vertebral level. As shown, the transverse coupler 300 includes a shaft 302, a stationary coupler 304 and an adjustable coupler 306. The shaft 302 includes a first end 312 and a second end 314. Each end 312, 314 may include an attachment means 316 for attachment of, mating with and/or coupling with a manipulating component (e.g., manipulating component 500) as will be described herein. The shaft 302 may include ratchet teeth 318 about a substantial length of the shaft 302. The stationary coupler 304 may be disposed about one end 312, 314 of the shaft 302 and the adjustable coupler 306 may be disposed about the other end 312, 314 opposite the stationary coupler 304. The adjustable coupler 306 is configured to be moveable about the shaft 302 relative to the stationary coupler 304. That is, the adjustable coupler 306 is configured to interact with ratchet teeth 318 and be moved about the shaft 302 by the user. Once in a desired position relative to the stationary coupler 304 about the shaft 302, the adjustable coupler 306 may be locked in place relative to the stationary coupler 304 via a latch 320 that may be configured to rotate about a rotational axis about a pin 319 to pivot between locked and unlocked positions. FIG. 16 shows the latch 320 in an unlocked position and FIG. 17 shows the latch 320 in the locked position. The latch 320 may also be configured with at least one spring-loaded ball plunger 321 which passively engage into holes 323 (FIG. 14) on the main housing 324 of the adjustable coupler 306 that provide a tactile indicator when the adjustable coupler 306 is in the locked and/or unlocked state and passively maintain the latch 320 in the locked and/or unlocked position. When the latch 320 is positioned in the locked position (FIG. 17), the latch 320 is configured to interact with a set of internal pawls 325 that can rotate and/or pivot about a pin 327 and interact with a torsion spring 329 which drives the rotation of the pawls 325 into the ratchet teeth 318 to prevent movement of the adjustable coupler 306 about the shaft 302. In the unlocked position (FIG. 16), the latch 320 is configured to interact with the set of internal pawls 325 and overcome the force of the torsion spring 329, which releases the engagement of the pawls 325 from the ratchet teeth 318 such that the adjustable coupler 306 may move freely about the shaft 302. As such, the adjustable coupler 306 may be locked and unlocked relative to the stationary coupler 304 without another instrument separate from the VBD system 100 (FIG. 1-2), e.g., a locking instrument and/or lock screw. The couplers 304, 306 may be configured to couple with a proximal end of the derotation towers 200 as shown in FIGS. 1-2. Specifically, the transverse coupler 300 is configured to couple two derotation towers 200 positioned on opposing bone anchors 10 across a single vertebra. The couplers 304, 306 may each include a spring-loaded pawl lock 326 (FIG. 15) for maintaining a position of the derotation towers 200 within a central lumen 331 of the couplers 304, 306. In use, the user may simply push the couplers 304, 306 onto the proximal ends of the derotation towers 200 and/or rod reducer 270 to couple the couplers 304, 306 to the derotation towers 200. This causes the spring-loaded pawl lock 326 to engage with the circumferential groove 211 (FIGS. 3-4 and 6-7) of the inner elongate member 202 or a circumferential groove 292 of the rod reducer 270. In order to release the couplers 304, 306 from the derotation towers 200 and/or rod reducer 270, the user may simply press or apply a pressure to a button 328 on each coupler 304, 306. The central lumen 331 of each coupler 304, 306 allows access to the proximal ends of instruments coupled therein, e.g., derotation tower 200 and/or rod reducer 270. While the transverse coupler 300 has been shown and described as having an adjustable coupler and a stationary coupler, it is to be understood that the transverse coupler 200 may have two adjustable couplers or two stationary couplers.

Turning now to FIGS. 18-20, another embodiment of the transverse coupler 300 is shown. In this embodiment, at least one of the couplers 304, 306 is capable of having its angular orientation relative to the shaft 302 adjusted and locked. Specifically, the transverse coupler 300 may further include a knob 330 having a v-shaped tip 332 (FIG. 19) that engages with grooves 334 (FIG. 20) formed on outer wall of the coupler, e.g., stationary coupler 304 shown. The grooves 334 may be formed in a substantially arcuate manner around the angular rotation axis which allow for angular locking of the coupler 304. That is, as the user rotates the knob 330, the v-shaped tip 332 may engage with the grooves 334 of the freely rotating stationary coupler 304 to lock angular articulation of the coupler 304. While it is shown that knob 330 is used with one coupler 304, it is to be understood that knob 330 could be used with the other coupler 306 and/or both couplers 304, 306. Further, as shown in FIGS. 18 and 20, the couplers 304, 306 may each have extensions 340 extending therefrom for providing additional length to the couplers 304, 306. The extensions 340 may be substantially tubular in shape having a central lumen 342 extending therethrough and open to lumen 331 (FIGS. 14-15) of couplers 304, 306. The extensions 340 may include cutouts or recesses (hereinafter, "cutouts" 344) in opposing sides thereof. The cutouts 344 may be configured to be engaged with a clamp, e.g., clamp 400 (FIGS. 1-2 and 21-23), for coupling adjacent transverse couplers 300 in the cranial/caudal direction.

Turning now to FIGS. 21-23, a clamp 400 according to embodiments of the disclosure is shown. One or more clamps 400 may be used to couple instrumentation in the cranial/caudal direction which may be useful in performing an en bloc VBD technique. The clamp 400 includes a first arm 402 having a first end 404 and a second end 406, and a second arm 410 having a first end 412 and a second end 414. Each of the first arm 402 and the second arm 410 may include a compliant material 418, e.g., silicone, disposed on a side of each arm 402, 410 that faces the other arm 402, 410. The first arm 402 and the second arm 410 may be pivotably coupled at the first ends 404, 412 such that the first and second arms 402, 410 may pivot between an open and closed position. A locking mechanism 420 may be disposed on the second ends 406, 414 of the first and second arms 402, 410 to lock the clamp 400 in the locked position when desired. In one embodiment (FIG. 21), the locking mechanism 420 may include a ratcheting bar 422 configured to pivot about the second end 406 of the first arm 402 and configured to engage the second end 414 of the second arm 410. Further, this embodiment may include a tightening knob 424 disposed at the second end 414 of the second arm 410 for locking the ratcheting bar 422 to the second end 414 of the second arm 402, and thus maintain the clamp 400 in the closed position. In another embodiment (FIG. 22-23), the locking mechanism 420 may include a bar 426 that is pivotably coupled at the second end 406 of the first arm 402 and configured to engage with the second end 414 of the second arm 410. In this embodiment, a thumbwheel 428 may be used to translate along the bar 426 to lock the bar 426 to the second arm 410. At least a portion of the thumbwheel 428 may also have a keyed surface and/or outer perimeter 429 as shown in FIG. 23 for engaging with a tool to further tighten the thumbwheel 428 when needed. The rotation of the thumbwheel 428 may be done by hand. Alternatively, another tool or instrument may be used to cause rotation of the thumbwheel 428. For example, a dual-sided handle 1000 (FIG. 41) may be used to cause rotation of the thumbwheel 428 by engaging one of the corresponding keyed internal recesses 1004, 1008 (FIG. 41) with the keyed outer perimeter 429 of the thumbwheel 428 to facilitate further tightening of the thumbwheel 428 to lock the clamp 400.

While the present disclosure shows that the locking mechanism 420 in each embodiment includes bars 422, 426 that pivot about the first arm 402, it is to be understood that the reverse configuration may also be used without departing from aspects of the disclosure such that the bars 422, 426 may pivot about the second arm 410. Further, the clamp 400 may also include at least one attachment means 430 (FIGS. 21-22) on either the first arm 402 or the second arm 404 for attachment of, mating with and/or coupling with an attachment means of a manipulating component (e.g., manipulating component 500 (FIGS. 2 and 24) as will be described herein. However, as shown in FIG. 23, clamp 400 may also not have an attachment means for attachment of a manipulating component. As will also be described herein, at least one clamp 400 may be used in the VBD system 100 in order to couple various components of the VBD system 100 (e.g., one or more derotation towers 200, one or more transverse couplers 300, and/or one or more manipulating components 500) in the cranial/caudal direction. As shown in FIG. 1-2, two clamps 400 are shown coupling derotation towers 200 at a location distal of the transverse couplers 300. As shown in FIG. 21, two clamps 400 are shown coupling transverse couplers 300 at a location outside of the pairs of derotation towers 200. However, it is to be understood that a single clamp 400 could couple across shafts 302 (FIGS. 14-15 and 18) between the pairs of derotation towers 200.

Turning now to FIG. 24, a manipulating component 500 according to aspects of the disclosure is shown. The manipulating component 500 includes a gripping portion 502 and an attachment means 504. The gripping portion 502 is configured to be engaged by a user for manipulating instrumentation of the VBD system 100 and/or providing a counter-torque. The attachment means 504 is configured for attachment of, mating with and/or coupling with an attachment means disposed on another component of the VBD system 100, e.g., the attachment means 430 of the clamp 400 (FIGS. 21-22) or the attachment means 316 of the transverse coupler 300 (FIGS. 14-15 and 18). The attachment means 504 can include, e.g., a spring-loaded button mechanism for maintaining a position of the attachment means 430 of the clamp 400 or the attachment means 316 of the transverse coupler 300 within the central lumen of attachment means 504. The manipulating component 500 is optional as the user may simply grasp any portion of the derotation towers 200, the transverse couplers 300, and/or the clamps 400 (when used) to manipulate the instrumentation to perform segmental or en bloc VBD techniques.

As shown in FIG. 25, VBD system 100 may also include a derotation tower attachment assembly 600. The derotation tower attachment assembly 600 is configured to be placed on the proximal end 204 (FIGS. 3-7) of the inner elongate member 202 (FIGS. 1-8). The derotation tower attachment assembly 600 may be simply pressed over the proximal end 204 of the inner elongate member 202. The derotation tower attachment assembly 600 may include a central lumen 602. The central lumen 602 allows for the insertion of surgical instruments, rod reducer 270 (FIGS. 12-13) through the derotation tower attachment assembly 600 and through the derotation tower 200. The derotation tower attachment 600 provides a means for the manipulating component 500 (FIG. 24) to be optionally coupled to the derotation tower 200 such that the manipulating component 500 can be used to manipulate the derotation tower 200 directly by the user. As shown, the derotation tower attachment assembly 600 includes an attachment means 604 for attachment of, mating with and/or coupling with the attachment means 504 (FIG. 24) of the manipulating component 500. The derotation tower attachment assembly 600 may also include a button 606 and biasing member 608, e.g., a spring-loaded pawl lock, capable of being engaged within the circumferential groove 211 (FIGS. 3-4 and 6-7) of the inner elongate member 202. However, it is to be understood that the derotation tower 200 can be manipulated by the user without the use of the manipulating component 500 (and therefore, without the derotation tower attachment assembly 600) as the user may simply grasp a portion of the derotation tower 200 directly an apply a desired force.

Returning now to FIGS. 1-2, the VBD system 100 can be used to provide correction to an abnormal spinal curvature (i.e., correct an alignment of the spine) and/or derotate rotated spinal vertebrae. The VBD system 100 can be used to perform both segmental and en bloc VBD techniques. As shown, the VBD system 100 may include at least a first pair of derotation towers 200a and a second pair of derotation towers 200b. The pairs of derotation towers 200a, 200b can be coupled to respective pairs of anchors, e.g., anchor 10 (FIGS. 6-8), that are disposed on (e.g., fixated in) opposing sides of respective vertebral bodies. The VBD system 100 can also include a first transverse coupler 300a extending across the first vertebral body and coupled to each derotation tower 200 of the first pair of derotation towers 200a. A second transverse coupler 300b may extend across the second vertebral body and be coupled to each derotation tower 200 of the second pair of derotation towers 200b. If performing the en bloc technique, at least one clamp 400 is configured to couple a first derotation tower 200 of the first pair of derotation towers 200a and a second derotation tower 200 of the second pair of derotation towers 200b and/or the first and second transverse couplers 300a, 300b, e.g., across the shafts 302 (FIGS. 14-15 and 18), in the cranial-caudal direction. As shown, a third pair of derotation towers 200c may be coupled to a third pair of bone anchors that are disposed on opposing sides of a third vertebral body. Additionally, a third transverse coupler 300c may extend across the third vertebral body and coupled to each derotation tower 200 in the third pair of derotation towers 200c. Further, the clamp 400 may also be used to couple a third derotation tower 200 in the third pair of derotation towers 200c with derotation towers 200 of the first and second pair of derotation towers 200a, 200b and/or the third transverse coupler 300c with the first and second transverse couplers 300a, 300b in the cranial-caudal direction.

Figure 26:
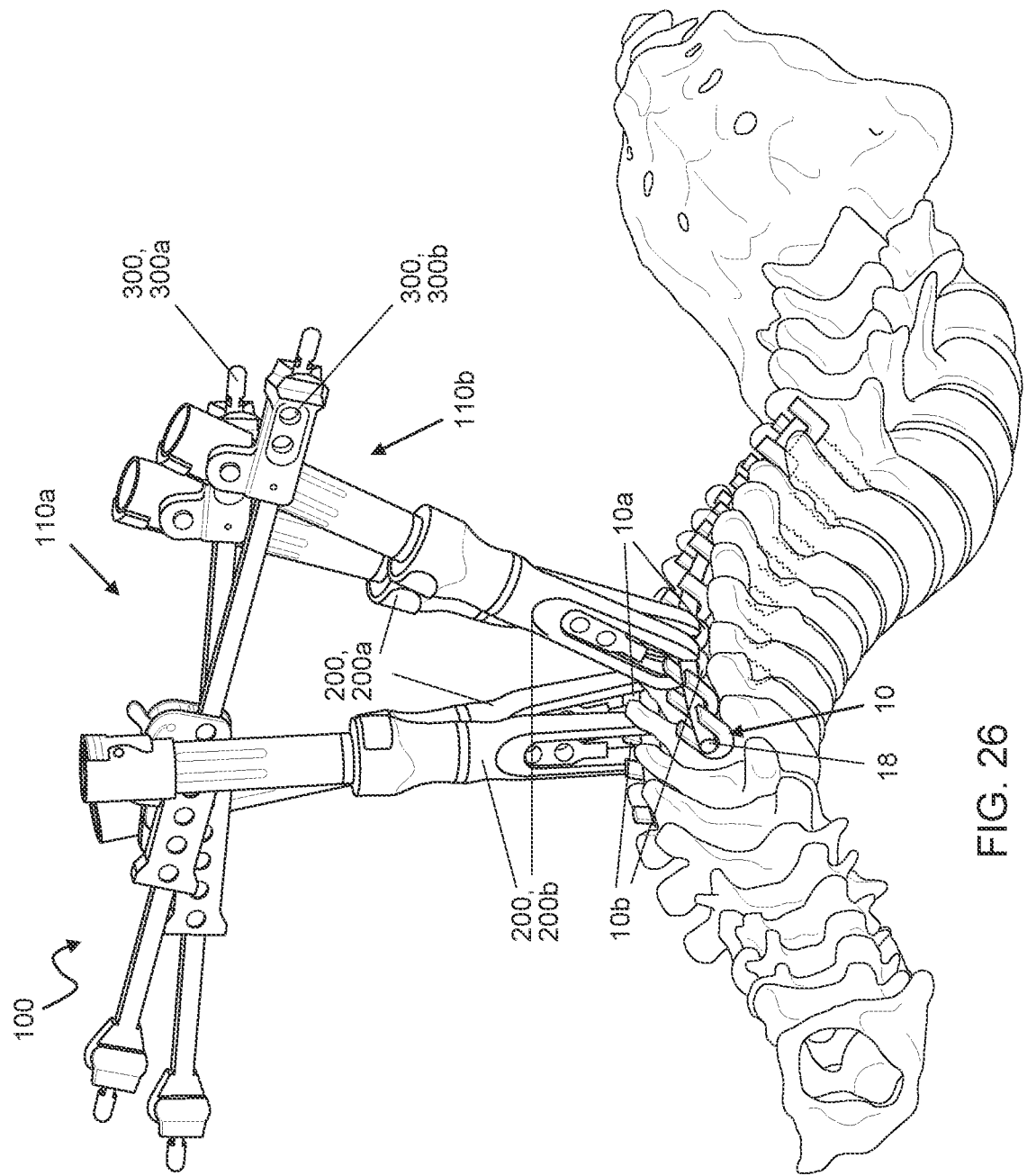
FIG. 26 shows a perspective view of embodiments of the VBD system used for a segmental VBD technique.

In operation, bone anchors 10 are placed in each pedicle of a desired number of vertebrae. Referring to FIGS. 6-8 and 20-21, bone anchors 10 are fixed in the pedicles of at least the most cranial and caudal vertebrae in the neutral position, i.e., not rotated, and in the pedicles of the vertebrae in between. The user can couple the desired number of derotation towers 200 to the bone anchors 10 fixed in spine. The receivers 12 of the bone anchors 10 should be substantially aligned. Once bone anchors 10 are fixed and receivers 12 aligned, a first fixation rod 18 may be inserted in the bone anchors 10 on one side of the vertebrae. In this technique, a second fixation rod 18 may be inserted in the bone anchors 10 on the opposing side after derotation is complete. However, some users may choose to insert two fixation rods at this time prior to performing derotation. The fixation rods 18 may be inserted within the anchors 10 through use of the derotation towers 200 and rod reducers 270 (FIGS. 3-4 and 6-8). Specifically, with the derotation tower 200 positioned in the unlocked position (FIGS. 3-5), and the rod reducer 270 positioned within the inner elongate member 202, the derotation tower 200 can capture the fixation rod 18 such that the fixation rod 18 is positioned within the channel 212 between the extensions 210. The derotation tower 200 with the captured fixation rod 18 within the channel 212 can be coupled with the respective bone anchor 10. The derotation tower 200 can then engage the receiver 12 of the bone anchor 10 by applying downward pressure such that the deflectable arms 216 engage the receiver 12 as discussed herein. Next, the user can engage the actuation mechanism 234 to transition the derotation tower 200 from the unlocked position to the locked position (FIGS. 6-8). The rod reducer 270 may then be rotated such that the rod reducer 270 translates in the distal direction to reduce or seat the rod into the receiver 12 between upright arms 14.

Where a segmental VBD technique is being performed (FIG. 26), a first pair of derotation towers 200a may be coupled to a first pair of bone anchors 10 fixed within pedicles of a single neutral vertebra, and a second pair of derotation towers 200b can be coupled to a second pair of bone anchors 10 fixed within pedicles of the first superior or inferior rotated vertebra relative to the neutral vertebra. Next, a first transverse coupler 300a can be coupled to the first pair of derotation towers 200a to create an A-frame 110a. Specifically, the stationary coupler 304 can be coupled within one derotation tower 200 of the first pair of derotation towers 200a and the adjustable coupler 306 can be coupled with the other derotation tower 200 of the first pair of derotation towers 200a. The position of the adjustable coupler 306 relative to the stationary coupler 304 can be adjusted if needed and locked in place as described herein. Further, a second transverse coupler 300b can be coupled to the second pair of derotation towers 200b in the same way to create another A-frame 110b. At this point, one or more manipulating components 500 can be optionally attached to the attachment means 316 of the transverse couplers 300a, 300b.

Subsequently, locking screws (not shown) may be inserted through the lumen 201 (FIG. 5) of the derotation towers 200 via a driver, and in some cases through the rod reducers 270. The lock screws for the neutral vertebra (having the first pair of derotation towers 200a coupled thereto) can be provisionally tightened to provisionally lock the fixation rod 18 to the anchor 10. The lock screws for the rotated vertebra (having the second pair of derotation towers 200b coupled thereto) can be left loose within the derotation towers 200b. At this point, the rotated vertebra may be derotated by manipulation of the second pair of derotation towers 200b using known maneuvers using the neutral vertebra and the neutral A-frame 110a as a reference. Specifically, the user may grab a part of the transverse coupler 300b, the derotation towers 200b, and/or the manipulating component 500 (if used) to drive the derotation. To hold the rotational correction, the lock screws within the second pair of derotation towers 200b on the rotated vertebra can be provisionally locked. The A-frame 110a on the neutral vertebra can be removed, e.g., by unlocking the transverse coupler 300a from the first pair of derotation towers 200a, unlocking the first pair of derotation towers 200a, and removing the unlocked derotation towers 200a from the bone anchors 10 on the neutral vertebra. The process may now be repeated for the next superior or inferior rotated vertebra using the newly derotated vertebra and second A-frame 110*b* thereon as a reference. This process can be repeated until all rotated vertebra are derotated.

If performing the en bloc technique (FIG. 27), the process may differ by coupling additional pairs of derotation towers 200*c*, 200*d* to additional desired vertebrae such that there are two or more pairs of derotation towers 200 coupled with two or more adjacent vertebrae about the curvature of the rotated spine before performing the derotation maneuver. The transverse couplers 300 may be coupled to any desired pairs of the derotation towers 200. In some embodiments (shown), a transverse coupler 300 may be coupled to each pair of derotation towers 200 such that a first transverse coupler 300*a* is coupled with the first pair of derotation towers 200*a* about the neutral vertebra, a second transverse coupler 300*b* is coupled with the second pair of derotation towers 200*b*, a third transverse coupler 300*c* is coupled with a third pair of derotation towers 200*c*, and a forth transverse coupler 300*d* is coupled with a fourth pair of derotation towers 200*d*. In other embodiments (not shown), a transverse coupler 300 may be coupled to only the most cranial pair of derotation towers 200 and the most caudal pair of derotation towers 200 in the en bloc group (e.g., about the apex). One or more clamps 400 may be used to couple the instrumentation in the cranial/caudal direction. The one or more clamps 400 may couple across shafts 302 of adjacent transverse couplers 300 in the en bloc group, across the proximal ends 204 (FIGS. 3-7) of the derotation towers 200 in the en bloc group, and/or across portions of the derotation towers 200 beneath the transverse couplers 300 in the en block group. Where optional manipulating components 500 are coupled with multiple transverse couplers 300, one or more clamps 400 can couple across adjacent manipulating components 500 in the en bloc group in the cranial/caudal direction. It is to also be understood that any combination of the clamp 400 locations disclosed herein can also be used without departing from aspects of the disclosure. Further, clamps 400 can be positioned on one or both sides of the construct without departing from aspects of the disclosure. To couple clamps 400 to the desired instruments, the clamps 400 should be positioned in the open position to grasp the desired instrumentation and then can be closed to lock on to the instrumentation. A single A-frame construct 110*a* may be formed on a desired neutral vertebra to be used as a reference. Once the single A-frame construct and the en bloc construct are formed, the derotation maneuver can be performed as known in the art. To perform the maneuver, the user can grasp on to any instrumentation in the construct to align the en bloc construct with the single A-frame construct about the neutral vertebrae. Specifically, the user can grasp a part of the transverse couplers 300, the derotation towers 200, the clamps 400, and/or the manipulating components 500 (if used) to drive the derotation of the en bloc group. To hold the rotational correction, lock screws can be inserted within the derotation towers 200 and tightened in the bone anchors 10 on the rotated vertebra.

Figure 33:
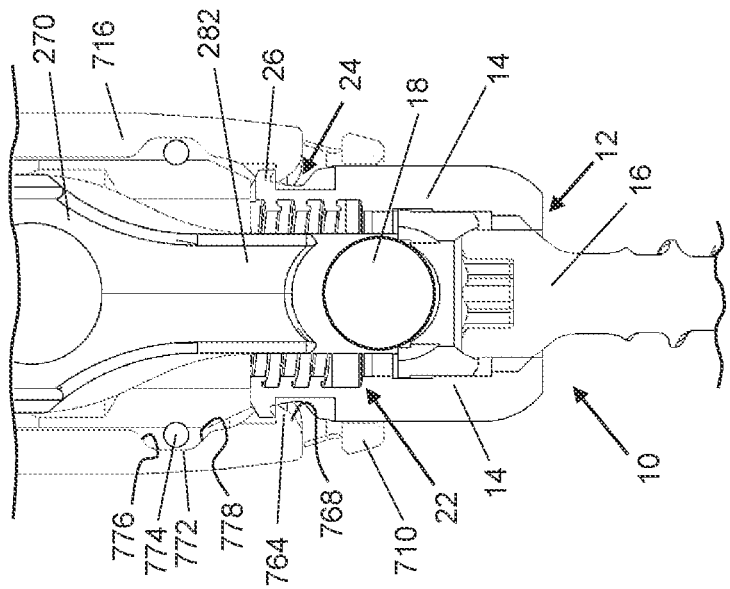
FIG. 33 shows an enlarged cross-sectional view of the distal end of the derotation tower of FIG. 30.
Figure 32:
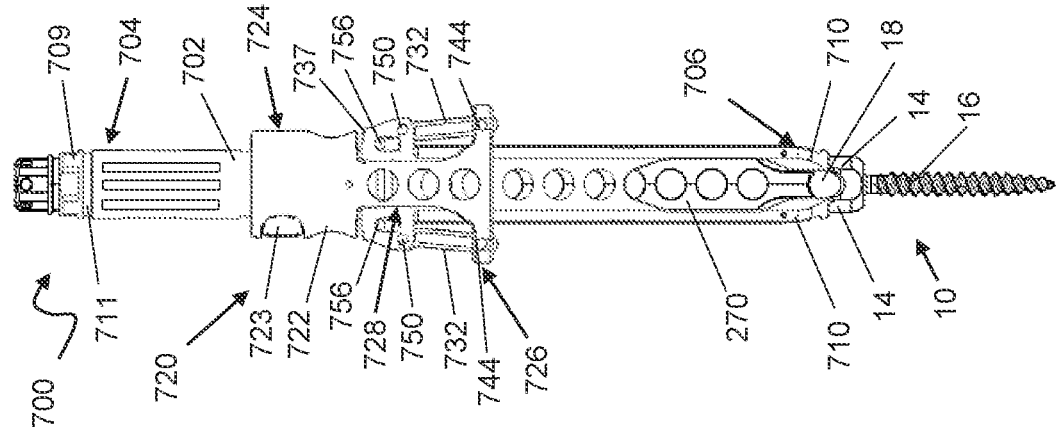
FIG. 32 shows a front side view of the derotation tower of FIG. 28 in the locked position according to embodiments of the disclosure.

Turning now to FIGS. 28-33 another embodiment of a derotation tower 700 is shown. The derotation tower 700 may be used in alternative to the derotation tower 200 (FIGS. 1-7) with VBD system 100 (FIG. 1) to perform both segmental and en bloc derotation techniques. In this embodiment, the derotation tower 700 includes an inner elongate member 702 having a proximal end 704 and a distal end 706. The inner elongate member 702 may include an inner lumen 701 (FIG. 29) extending the length of the inner elongate member 702 to allow passage of other surgical instruments therein, e.g., a rod reducer 270. Thus, the inner elongate member 702 may be substantially tubular in shape in some embodiments. The proximal end 704 of the inner elongate member 702 may include a thread 708 (FIG. 29) on an inner surface thereof and a head 709 sized and shaped to allow coupling of the derotation tower 700 with another instrument, e.g., derotation attachment assembly 600 (FIG. 25). The head 709 may be keyed to prevent rotation of the derotation tower 700 relative to the instrument coupled thereto. The proximal end 704 of the inner elongate member 702 may also include a circumferential groove 711 distal to the head 709. As described herein, the thread 708 may be configured to thread with the rod reducer 270. The distal end 706 includes a pair of opposing extensions 710 separated by a channel 712. Each extension 710 includes a moveable and/or translating attachment arm 716 (FIG. 30-31) configured to translate between unlocked and locked positions. Each attachment arm 716 is disposed within a longitudinal recess 718 (FIG. 30) formed within a respective extension 710. Each longitudinal recess 718 is dimensioned to receive the length of the attachment arm 716 therein which helps reduce the lateral profile of the derotation tower 700. Each attachment arm 716 includes a distal ridge 764 (FIG. 33) extending within lateral openings 766 (FIGS. 30-31) at the distal end 706 of the derotation tower 700. The lateral openings 766 are adapted to allow passage of the distal ridge 764 of the attachment arm 716 to enable the distal ridge 764 to engage the receiver 12 (FIG. 33). As shown most clearly in FIG. 33, each longitudinal recess 718 includes a displacement feature 774 that extends from the sidewall of the longitudinal recess 718. The displacement feature 774 may be a projection, protrusion, pin, protuberance, ramp, or any other means known in the art for exerting an outward force on the attachment arms 716 as described further herein. Each attachment arm 716 is configured to translate between unlocked and locked positions. The attachment arm 716 may be configured to engage with and/or mate with a corresponding attachment feature on a bone anchor, such as the instrument engagement features 24 (FIG. 33) of the bone anchor 10 (FIGS. 32-33).

The derotation tower 700 according to this embodiment includes an actuation mechanism 720 disposed over and/or about the inner elongate member 702 to facilitate transitioning of the derotation tower 700 between locked and unlocked positions. At least a portion of the actuation mechanism 720 is configured to be moveable or slide about the inner elongate member 702 between unlocked and locked positions. For example, the actuation mechanism 720 can include a base member 722 configured to slide about the inner elongate member 702 between the unlocked and locked positions. The movement of the base member 722 may be controlled by a body member 723 which can be configured as the body member 236 (FIGS. 3-7 and 9-11) and can be biased against an outer surface of the inner elongate member 702 by a biasing member (not shown) similarly to biasing member 238 (FIGS. 9-11). The base member 722 may include a proximal portion 724, a distal portion 726 and a central portion 728 disposed between the proximal portion 724 and the distal portion 726. The actuation mechanism 720 may also include a pair of pivoting arms 732 on opposing sides of the inner elongate member 702. Each pivoting arm 732 includes a distal portion 734 (FIG. 29) being coupled with the base member 722, a central portion 736 (FIG. 29) being coupled to the inner elongate member 702 at a pivot point (i.e., projection 750), and a proximal portion 738 (FIG. 29) being coupled to the attachment arm 716. The base member 722 is configured to slide distally during the transition of the derotation tower 700 from the unlocked position to the locked position such that sliding of the base member 722 causes the pivoting arms 732 to pivot about the pivot point and such that the attachment arm 716 of each extension 710 translates proximally upon the pivoting of the pivoting arms 732. A bend or flection (hereinafter, "bend") 739 (FIG. 29) may be formed between the proximal portion 738 and the distal portion 734 at the central portion 736 of each pivoting arm 732.

The distal portion 734 of each pivoting arm 732 may include a slot 742 extending along a substantial length of each pivoting arm 732. The pivoting arms 732 may each be coupled with the distal portion 726 of the base member 722 via a projection, protrusion, pin, protuberance, etc. (hereinafter "projection") 744. The projection 744 may be fixedly attached to and/or integrated with the distal portion 726 of the base member 722. The projection 744 may also extend at least partially through the slot 742 within the distal portion 734 of the pivoting arm 732. The projection 744 may extend through the slot 742 such that it can slide or translate within the slot 742 as will be described herein. In some embodiments (shown), each pivoting arm 732 and the distal portion 726 of the base member 722 may be coupled together via a pin that extends through opposing apertures within the distal portion 726 of the base member 722 and within the slot 742 of each pivoting arm 732. With two pivoting arms 732, there may be two pins (one for each pivoting arm 732) for coupling on opposing sides of the inner elongate member 702.

The central portion 736 of each pivoting arm 732 may be coupled with the inner elongate member 702 in a similar manner. For example, via a projection, protrusion, pin, protuberance, etc. (hereinafter "projection") 750. However, unlike the projection 744 which is capable of sliding or translating within the slot 742 of the pivoting arm 732, the projection 750 acts as a pivot point about which the pivoting arm 732 may pivot as will be described herein. As such, this projection 750 may at least partially extend within an aperture formed within the central portion 736 of the pivoting arm 732. In some embodiments (shown), each pivoting arm 732 and the inner elongate member 702 may be coupled together via a pin that extends through opposing apertures within the inner elongate member 702 and an aperture disposed within the central portion 736 of the pivoting arms 732. In some embodiments (shown), the central portion 736 of each pivoting arm 732 may be pivotably coupled with the inner elongate member 702 at a bulge 737, e.g., a larger dimensioned portion, (FIGS. 28-29 and 32) formed about the inner elongate member 702.

Figure 28:
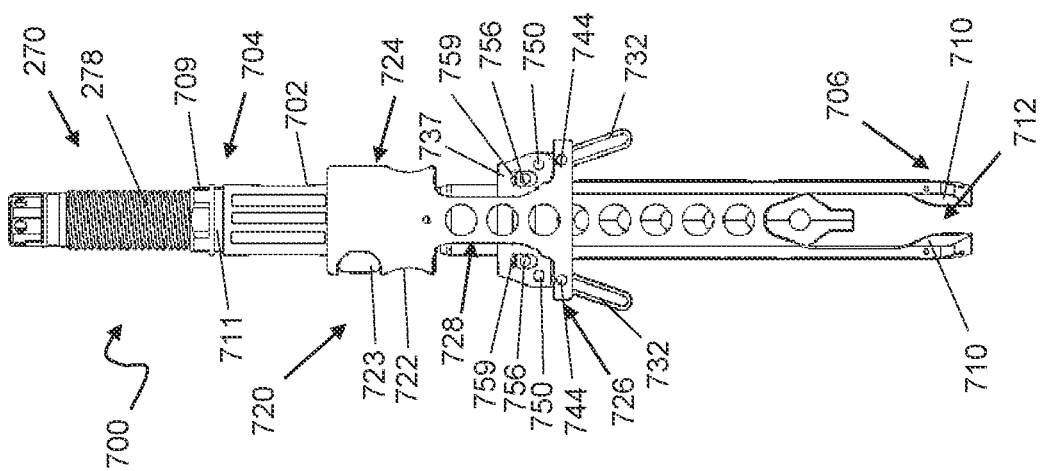
FIG. 28 shows a front side view of a derotation tower in an unlocked position according to an embodiment of the disclosure.

The proximal portion 738 of each pivoting arm 732 is coupled to a respective attachment arm 716 via another projection, projection, pin, protuberance, etc. (hereinafter "projection") 756. Like projection 744, this projection 756 can slide and/or translate within a slot 758 formed within the proximal portion 738 of the pivoting arm 732. The projection 756 is fixedly attached to the attachment arm 716 such that upon movement of the projection 756 within the slot 758 at the proximal portion 738 of the pivoting arm 732, the attachment arm 716 also moves. Further, the projection 756 may at least partially extend through a slot 759 (FIG. 28) formed within the bulge 737 about the inner elongate member 702. As shown in FIG. 28, the slot 759 extends substantially parallel to the longitudinal axis of the inner elongate member 702 whereas the slot 758 extends at an angle to the longitudinal axis of the inner elongate member 702 and relative to the slot 742 within the distal portion 734 of the pivoting arms 732. This configuration, in addition to the bend 739 (FIG. 29), causes inward and outward movement of the pivoting arms 732 as the projection 756 slides within the slots 758, 759 as will be described herein.

Figure 30:
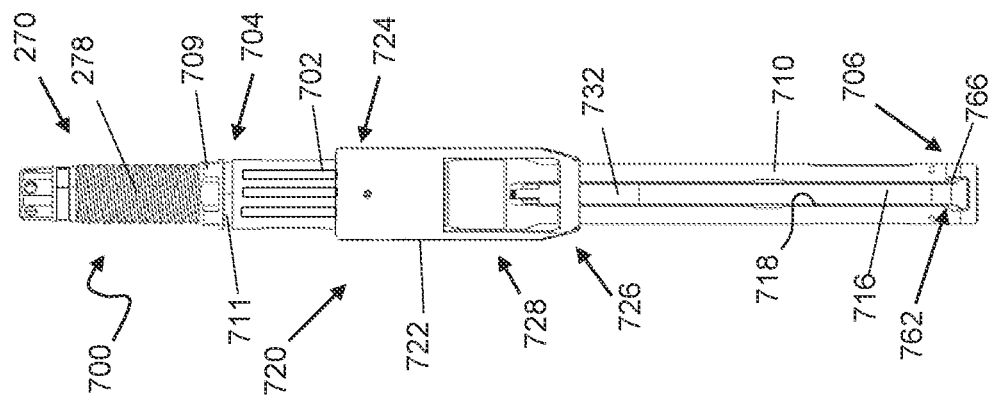
FIG. 30 shows side view of a derotation tower according to embodiments of FIG. 28.
Figure 29:
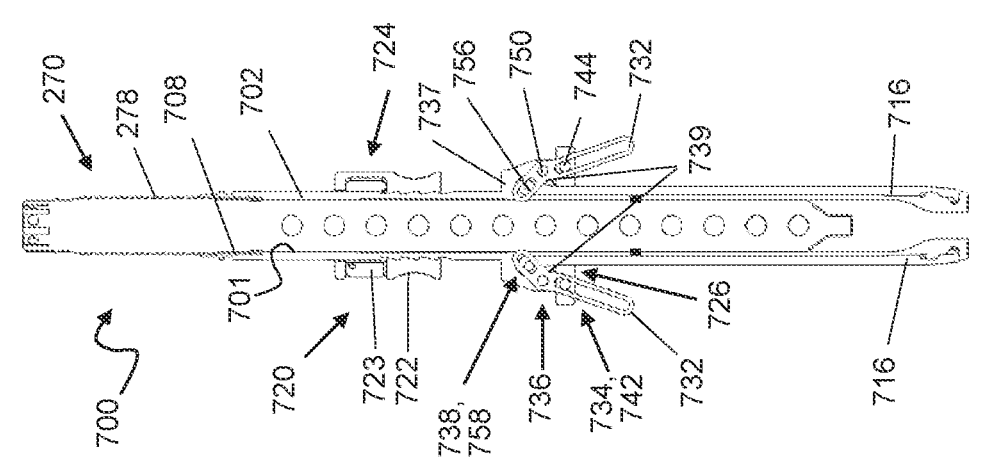
FIG. 29 shows a cross-sectional view of the derotation tower of FIG. 28 according to embodiments of the disclosure.
Figure 31:
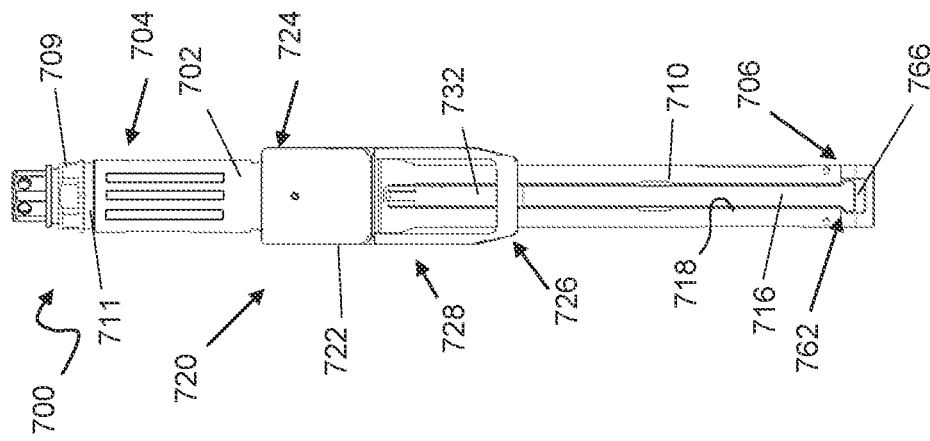
FIG. 31 shows a side view of the derotation tower of FIG. 28 in a locked position according to embodiments of the disclosure.

FIGS. 28-30 show the derotation tower 700 in the unlocked position and FIGS. 31-33 show the derotation tower 700 in the locked position. In order to transition the derotation tower 700 from the unlocked position to the locked position, the user may engage the body member 723 of the actuation mechanism 720 to cause movement of the base member 722 relative to the inner elongate member 702. For example, the user may cause sliding of the base member 722 in a distal direction relative to the inner elongate member 702 until the proximal portion 724 of the base member 722 abuts the bulge 737 of the inner elongate member 702. As a result, the distal portion 726 of the base member 722 also moves in the distal direction. Because the projection 744 is fixed to the distal portion 726 of the base member 722, the projection 744 also moves in the distal direction with the distal portion 726. As the projection 744 moves distally, it slides distally within the slot 742 of the distal portion 734 of the pivoting arm 732. Due to the bend 739 and the slot 758 being angled relative to the slot 742, the distal portion 734 is caused to move inwardly toward the longitudinal axis of the inner elongate member 702. This further causes the pivoting arm 732 to pivot about the projection 750 that is positioned at the central portion 736 of the pivoting arm 732. In turn, the pivoting of the pivoting arm 732 causes the proximal portion 738 of the pivoting arm 732 to move outwardly. The outward movement of the proximal portion 738 of the pivoting arm 732 causes the projection 756 to move within the slots 758, 759 in a generally proximal direction. Because the projection 756 is fixed with the attachment arm 716, the proximal movement of the projection 756 causes proximal movement of the attachment arm 716.

The distal end 762 of the attachment arm 716 includes a distal ridge 764 (FIG. 33) that extends through the lateral opening 766 (FIGS. 30-31) in the inner elongate member 702 to engage the engagement features 24 (FIG. 33) of the receiver 12 (FIG. 33). Each distal ridge 764 has a distal-facing tapered surface 768 (FIG. 33) that is inwardly tapered. Just proximal to the distal ridge 764 is an angled recess 772 (FIG. 33) that interacts with the displacement feature 774 (FIG. 33) of the longitudinal recess 718 (FIGS. 30-31) of the extensions 710. When the derotation tower 700 is in the locked position, the displacement feature 774 is located within the space of the angled recess 772, between a proximal face 776 (FIG. 33) and a distal face 778 (FIG. 33) of the angled recess 772. Additionally, the distal ridge 764 is pulled proximally against a proximal ridge 26 (FIG. 33) on the proximal end of the receiver 12. In this way, the distal ridge 764 is in tight contact with the proximal ridge 26 and toggle is limited between the derotation tower 700 and the receiver 12. With the derotation tower 700 coupled and locked with the bone anchor 10, the user can cause translation of the rod reducer 270 and derotation of the vertebra in the same way as described relative to the derotation tower 200.

To transition the derotation tower 700 back to the unlocked position from the locked position, the user may again engage the body member 723 of the actuation mechanism 720. Specifically, the user may engage the body member 723 to move the base member 722 in the proximal direction thereby causing the distal portion 726 of the base member 722 to move in the proximal direction. The proximal movement of the distal portion 726 of the base member 722 causes the projection 744 to move proximally within the slot 742. This proximal movement of the base member 722 also causes the central portion 736 of the pivoting arm to pivot about the projection 750 which in turn causes the projection 756 to move distally within the slot 758 at the proximal portion 738 of the pivoting arm 732. As a result, the attachment arm 716 (which is fixed to the projection 756) also moves distally and releases the tight contact of the distal ridge 764 of the attachment arm 716 from the ridge 26 of the receiver 12. When the derotation tower 700 is transitioned to the unlocked position, the proximal face 776 of the angled recess 772 contacts the displacement feature 774. In this position, the displacement feature 774 exerts an outward force on the attachment arm 716 pushing the attachment arms 716 apart to promote disengagement of the derotation tower 700 from the receiver 12.

Turning now to FIGS. 34-39 another embodiment of a derotation tower 800 is shown. The derotation tower 800 may be used as an alternative to the derotation tower 200 (FIGS. 1-9) with VBD system 100 (FIGS. 1-2). The derotation tower 800 is substantially similar to the derotation tower 700 and therefore, like numbering represents like features. The derotation tower 800 differs from the derotation tower 700 (FIGS. 28-33) in its actuation mechanism 820. Like the actuation mechanism 720 (FIGS. 28-32) of derotation tower 700, the actuation mechanism 820 of the derotation tower 800 includes a base member 722 including a proximal portion 724, a distal portion 726 and a central portion 728 between the proximal portion 724 and the distal portion 726. However, the actuation mechanism 820 includes a pivoting arm assembly 830 on each side of the inner elongate member 702 instead of a pivoting arm 732 (FIGS. 28-39) on each side. In this embodiment, each pivoting arm assembly 830 includes a distal pivoting arm 832 and a proximal pivoting arm 834. Each proximal pivoting arm 834 includes a bend 839 (FIG. 35) similar to the bend 739 of FIG. 23 separating a distal portion 840 (FIG. 35) of the proximal pivoting arm 834 from the proximal portion 841 (FIG. 35) of the proximal pivoting arm 834. The proximal pivoting arm 834 and the distal pivoting arm 832 of each pivoting arm assembly 830 are pivotably coupled, e.g., via a projection, protrusion, pin, protuberance, etc. (hereinafter, "projection") 836 that extends through apertures formed within each pivoting arm 832, 834. The distal pivoting arm 832 of each pivoting arm assembly 830 is also pivotably coupled with the inner elongate member 702, e.g., via a projection, protrusion, pin, protuberance, etc. (hereinafter, "projection") 838. In some embodiments (shown), the distal pivoting arm 832 may be pivotably coupled with the inner elongate member 702 at a distal bulge 842, e.g., a larger dimensioned portion, (FIGS. 34 and 38) formed about the inner elongate member 702. The proximal portion 841 of the proximal pivoting arm 834 includes a proximal aperture (not shown) and the distal portion 840 if the proximal pivoting arm 834 includes a distal slot 844. The distal slot 844 may extend a substantial length of the proximal pivoting arm 834. A projection, protrusion, pin, protuberance, etc. (hereinafter, "projection") 848 may couple each proximal pivoting arm 834 to the inner elongate member 702 and a proximal end of the attachment arms 716. Specifically, for each proximal pivoting arm 834, the projection 848 may extend through an aperture formed within proximal pivoting arm 834, an aperture within the proximal end of the corresponding attachment arm 716, and within a slot 850 formed within a proximal bulge 852 (FIGS. 34 and 38) of the inner elongate member 702 such that the projection 848 is moveable or slidable within the slot 850. Further, another projection, protrusion, pin, protuberance, etc. (hereinafter, "projection") 856 couples the proximal pivoting arm 834 with the distal portion 726 of the base member 722. Specifically, the projection 856 may extend through an aperture formed within the distal portion 726 of the base member 722 and through the distal slot 844 of each proximal pivoting arm 834.

FIGS. 28-30 show the derotation tower 800 in the unlocked position and FIGS. 37-39 show the derotation tower 800 in the locked position. In order to transition the derotation tower 800 from the unlocked position to the locked position, the user may engage the body member 723 of the actuation mechanism 820 to cause movement of the base member 722 relative to the inner elongate member 702 until the proximal portion 724 of the base member 722 abuts the proximal bulge 852 of the inner elongate member 702. For example, the user may cause sliding of the base member 722 in a distal direction relative to the inner elongate member 702. As a result, the distal portion 726 of the base member 722 also moves in the distal direction. Because the projection 856 is fixed to the distal portion 726, the projection 856 also moves in the distal direction. As the projection 856 moves distally, it slides distally within the distal slot 844 thereby causing the proximal pivoting arms 834 to move inwardly toward a longitudinal axis of the inner elongate member 702. The inward movement of the proximal pivoting arms 834 causes pivoting of the proximal and distal pivoting arms 832, 834 about the projection 836 and further causes the distal pivoting arm 832 to pivot about the projection 838. Additionally, the inward movement of the distal portion 840 of proximal pivoting arms 834 causes the outward movement of the proximal portion 841 of the proximal pivoting arms 834 due to bend 839. This outward movement in turn causes the projection 848 to slide within the slot 850 within the proximal bulge 852 of the inner elongate member 702 in a generally proximal direction. Because the projection 848 is fixed with the attachment arm 716, the proximal movement of the projection 848 causes proximal movement of the attachment arm 716.

The distal end 762 (FIGS. 36-37) of the attachment arm 716 includes a distal ridge 764 (FIG. 31) that extends through the lateral opening 766 (FIGS. 36-37) in the elongate inner member 702 to engage the engagement features 24 (FIG. 39) of the receiver 12 (FIG. 39). Each distal ridge 764 has a distal-facing tapered surface 768 (FIG. 39) that is inwardly tapered. Just proximal to the distal ridge 764 is an angled recess 772 (FIG. 39) that interacts with the displacement feature 774 (FIG. 39) of the longitudinal recess 718 (FIG. 36-37) of the extensions 710. When the derotation tower 800 is in the locked position, the displacement feature 774 is located within the space of the angled recess 772, between a proximal face 776 (FIG. 39) and a distal face 778 (FIG. 39) of the angled recess 772. Additionally, the distal ridge 764 is pulled proximally against a proximal ridge 26 (FIG. 39) on the proximal end of the receiver 12. In this way, the distal ridge 764 is in tight contact with the proximal ridge 26 and toggle is limited between the derotation tower 800 and the receiver 12. With the derotation tower 800 coupled and locked with the bone anchor 10, the user can cause translation of the rod reducer 270 and derotation of the vertebra in the same way as described relative to the derotation tower 800.

To transition the derotation tower 700 back to the unlocked position from the locked position, the user may again engage the body member 723 of the actuation mechanism 720. Specifically, the user may engage the body member 723 to move the base member 722 in the proximal direction thereby causing the projection 856 coupled to the distal portion of the proximal pivoting arm 834 to slide proximally within the distal slot 844. The proximal movement of the base member 722 causes the projection 856 to move proximally within the slot distal 844. This proximal movement of the base member 722 also causes the proximal pivoting arm 834 to pivot about the projection 848 which in turn causes the projection 848 to move distally within the slot 850 within the proximal bulge 852. As a result, the attachment arm 716 (which is fixed to the projection 848) also moves distally and releases the tight contact of the distal ridge 764 (FIG. 39) of the attachment arm 716 from the ridge 26 (FIG. 39) of the receiver 12. Additionally, the proximal pivoting arm 834 and the distal pivoting arm 832 each pivot about the projection 836 and the distal pivoting arm 832 further pivots about the projection 838. When the derotation tower 800 is transitioned to the unlocked position, the proximal face 776 of the angled recess 772 contacts the displacement feature 774. In this position, the displacement feature 774 exerts an outward force on the attachment arm 716 pushing the attachment arms 716 apart to promote disengagement of the derotation tower 700 from the receiver 12.

It is to be understood that any now known or later developed rod reduction instrument may also be used as an alternative to the derotation towers 200, 700, 800 within VBD system 100. For example, one type of rod reduction instrument that can be used is disclosed in U.S. patent application Ser. No. 16/007,861, filed on Jun. 13, 2018, which is incorporated herein by reference as if the entire contents of which are set forth herein.

In another embodiment of the disclosure one or more guide assemblies and rod reducers may together be used to perform derotation as part of VBD system 100 in alternative to the derotation towers 200, 700, 800. For example, the guide assemblies of any one of U.S. Pat. Nos. 9,198,692, 9,198,698, 9,492,208, and 9,757,166 may also be used, each of which is incorporated herein by reference as if set forth the contents of which are set its entirety. Further, the rod reducers may include any of the rod reduction instruments disclosed in U.S. Pat. No. 9,198,698, which is incorporated herein by references as if the contents of which are set forth in its entirety.

Figure 46:
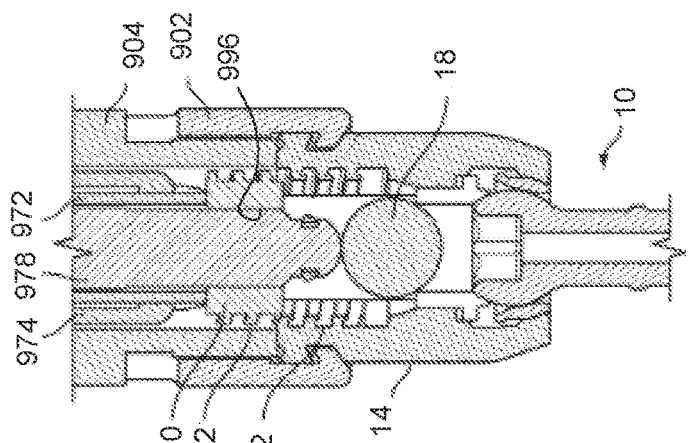
FIG. 46 shows an enlarged cross-sectional view of FIG. 44 having a lock screw coupled to the reduction instrument.
Figure 45:
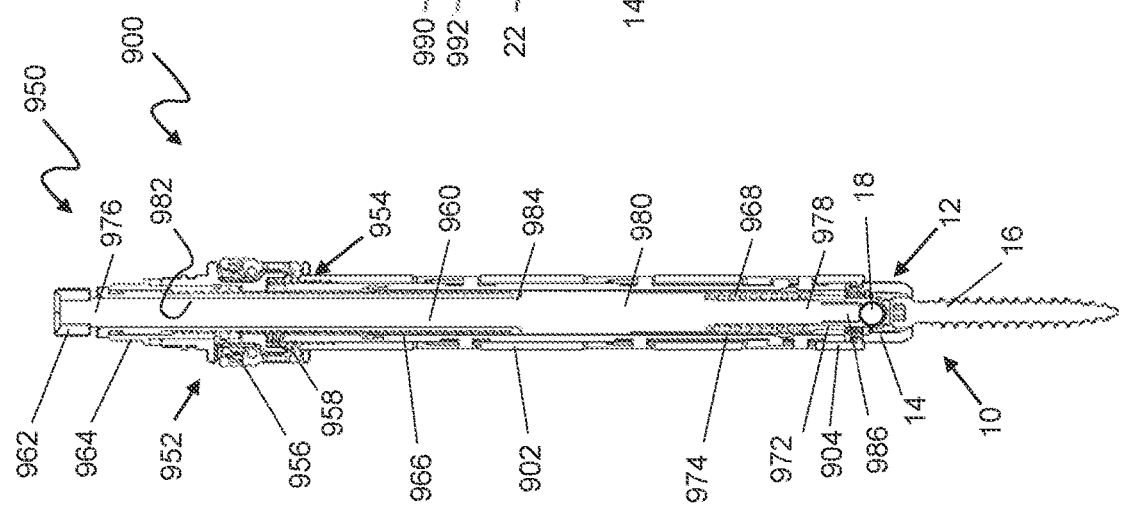
FIG. 45 shows a cross-sectional view of FIG. 44.
Figure 44:
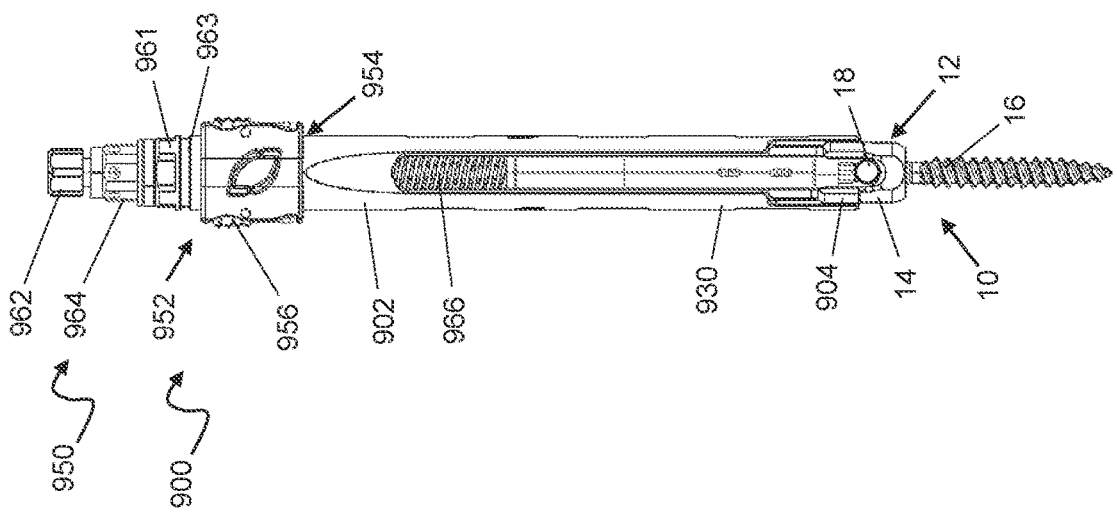
FIG. 44 shows a front side view of the guide assembly coupled with the reduction instrument according to embodiments of the disclosure.

For example, FIGS. 40-41 show one embodiment of a guide assembly 900. By way of example only, the guide assembly 900 includes an outer sleeve 902 and a pair of independent inner arm members 904 positioned within the outer sleeve 902. The arm members 904 are configured to releasably engage the receiver 12 of the bone anchor 10 (FIGS. 44-46). The distal engagement region 906 of the arm members 904 and the interaction with the bone anchor 10 is identical to that described in relation to U.S. Pat. No. 9,198,698. The arm members 904 are moveable between a first position and a second position. When in the first "unlocked" position, the arm members 904 are not engaged with in the bone anchor 10. In the second, "locked" position, the arm members 904 are engaged with the bone anchor 10, and the bone anchor 10 is "locked" to the guide assembly 900. A castle nut (not shown) may be used to actuate the guide assembly 900 between locked and unlocked positions.

The outer sleeve 902 is a generally tubular member having a proximal end 910, a distal end 912, and a lumen extending longitudinally through the outer sleeve 902. The outer sleeve 902 is further provided with a plurality of elongated apertures 918 positioned opposite one another on either side of the outer sleeve 902 and configured to receive projections 920 of the inner arm members 904 to facilitate the secure engagement of the inner arm members 904 to the outer sleeve 902. A circumferential groove 922 is positioned near the proximal end 910 and configured to receive the ridges 958 of the spring lock 956 of the reduction instrument 950. In this fashion, the guide assembly 900 may be releasably coupled to the reduction instrument 950. The outer sleeve 902 further includes a pair of longitudinal slots 926 extending proximally from the distal end 912 of the outer sleeve 902. The longitudinal slots 926 act in concert for form a channel 928 to guide the fixation rod 18 (FIGS. 44-46) to the surgical target site during implantation. By way of example only, the slots 926 extend a little over halfway along the outer sleeve 902. The slots 926 effectively divide the distal portion of the outer sleeve 902 into first and second outer arms 930. The distal engagement regions 906 of the inner arm members 904 may be configured as described in U.S. Pat. No. 9,198,698 to couple the inner arm members 904 with the bone anchor 10.

FIGS. 42-43 show an example of a reduction instrument 950 to be used together with the guide assembly 900. After the guide assembly 900 is secured to the bone anchor 10, the reduction instrument 950 may be inserted through the proximal end 910 of the guide assembly 900 and used to reduce and/or fully seat the fixation rod 18 into the receiver 12 (FIGS. 44-45) of the bone anchor 10. The reduction instrument 950 includes a connector 952 that releasably couples the reduction instrument 950 to the guide assembly 900. The connector 952 has a guide cavity 954 into which the proximal end 910 of the outer sleeve 902 is received as shown in FIGS. 44-45. The proximal end 910 of the guide assembly 900 is keyed to the guide cavity 954 so as to prevent rotation of the guide assembly 900 relative to the reduction instrument 950. Spring locks 956 on the connector 952 are provided to prevent translation of the guide assembly 900 relative to the reduction instrument 950. Specifically, the spring locks 956 include ridges 958 that extend through the connector 952 into the guide cavity 954 and engage the circumferential groove 922 situated below the proximal end 910 when the guide assembly 900 is mated with and/or coupled with the reduction instrument 950. The ridges 958 allow the proximal end 910 of the guide assembly 900 to push past the spring locks 956 until the ridges 958 snap into place within the circumferential groove 922. To release the connection between the reduction instrument 950 and the guide assembly 900, the proximal ends of the spring locks 956 can be depressed causing the ridges 958 to lift out of the circumferential groove 922, thus allowing the removal of the proximal end 910 of the guide assembly from the guide cavity 954 of the reduction instrument 950.

The reduction instrument 950 has an elongated central shaft 960 extending longitudinally through the entire length of reduction instrument 950. The reduction instrument 950 further includes head 961, a circumferential groove 963, a rotation knob 962, a translation knob 964, a threaded shaft 966, a spring 968 (FIG. 43), an inner sleeve 972, and an outer sleeve 974. The head 961 and circumferential groove 963 are configured to be engaged with, mated with, and/or coupled with the transverse coupler 300 in the same way as was described relative to head 209 (FIGS. 3-4 and 6-7) and circumferential groove 211 (FIGS. 3-4 and 6-7) of the derotation tower 200 (FIGS. 3-7). The central shaft 960 has a proximal portion 976 (FIG. 43), a distal portion 978 (FIG. 43), and a block portion 980 (FIG. 43) that is situated between the proximal portion 976 and the distal portion 978. The proximal portion 976 is generally cylindrical and extends proximally from the block portion 980 through the threaded shaft 966, the translation knob 964, and the rotation knob 962. The distal portion 978 is generally cylindrical and extends distally from the block portion 980. The rotation knob 962 is fixedly attached to the central shaft 960, and thus rotation of the rotation knob 962 causes rotation of the central shaft 960. The translation knob 964 has a threaded aperture 982 that is dimensioned to receive the proximal end of the threaded shaft 966. The translation knob 964 is rotatable in both clockwise and counterclockwise directions. As will be explained, turning the translation knob 964 in a one direction ultimately advances the central shaft 960 and reduces the fixation rod 18 into the receiver 12. As will be explained, the rotation knob 962 rotates independently of the translation knob 964 in both a clockwise and counterclockwise direction, and turning the rotation knob 962 in a one direction advances a lock screw (FIG. 46) into the receiver 12 of the bone anchor 10. The rotation knob 962 and the translation knob 964 may each have an outer perimeter that is keyed, and more specifically, the rotation knob 962 may be keyed differently from the translation knob 964.

Figure 47:
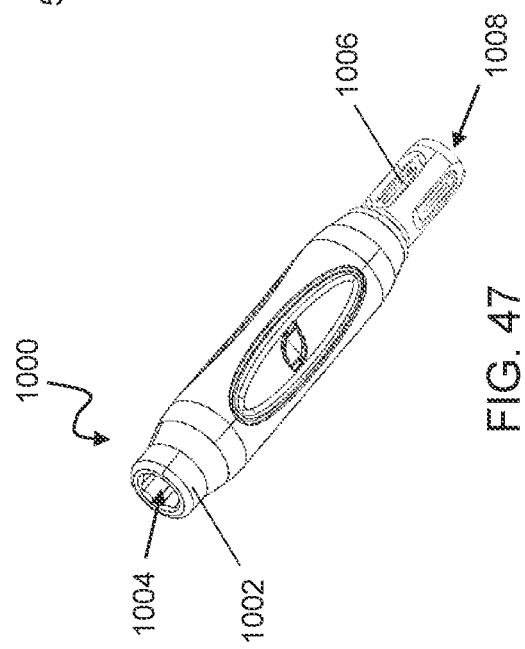
FIG. 47 shows a perspective view of a dual-sided handle according to embodiments of the disclosure.

The rotation of the rotation knob 962 and the translation knob 964 may be done by hand. Alternatively, another tool or instrument may be used to cause rotation of the rotation knob 962, 964. For example, a dual-sided handle 1000 (FIG. 47) may be used to cause rotation of the rotation knob 962 and the translation knob 964 separately. For example, the dual-sided handle 1000 may include a first side 1002 having a first internal recess 1004 that is keyed and configured to mate with the rotation knob 962 and a second side 1006 having a second internal recess 1008 that is keyed and configured to mate with the translation knob 964. In other embodiments, two separate instruments may be used, one to actuate the rotation knob 962 and another to actuate the translation knob 964.

The threaded shaft 966 is mated at its proximal end with the threaded aperture 982 of the translation knob 964 and engages with the central shaft 960 at the proximal side of the block portion 980. An abutment insert 984 is positioned proximally of the block portion 980 and provides an abutment surface for the threaded shaft 966. Rotation of the translation knob 964 causes the threaded shaft 966 to translate up or down through the threaded aperture 982, translating the central shaft 960 and rotation knob 962 up or down with it. The distal portion 978 of the central shaft 960 extends distally from the block portion 980. The distal portion 978 extends through a spring 968 and an inner sleeve 972. The spring 968 is positioned just distally of the block portion 980, between the block portion 980 and the inner sleeve 972. The spring 968 and inner sleeve 972 are contained within an outer sleeve 974. The distal portion 978 of the central shaft 960 has a distal rounded reduction end 986 that is configured to engage the fixation rod 18 and reduce it into the receiver 12. Alternatively, the distal reduction end 986 may be a generally planar rather than rounded. A lock screw engagement feature 988 is provided on the distal portion 978. The lock screw engagement feature 988 is configured to temporarily hold a lock screw 990 (FIG. 46) while preventing rotation of the lock screw 990 relative to the central shaft 960. By way of example only, the lock screw engagement feature 988 may have a hexalobe shape, however other shapes that prevent rotation of the lock screw relative to the central shaft 960 are possible. The lock screw 990 also has a guide and advancement feature 992 (FIG. 46) such as by way of example, a helically wound flange feature disposed on the outer circumference of the lock screw 990. The guide and advancement feature 992 mates with a complementary locking cap guide and advancement feature 22 (FIG. 46) on the receiver 12 (FIG. 46). The lock screw 990 engages the receiver 12 via the complementary guide and advancement features 22, 992 to press and lock the fixation rod 18 into the receiver 12. One or more windows 991 may be formed in the outer sleeve 974 near the top of the inner sleeve 972. The windows 991 may provide a visual indication (for example, a color-coded indication) of when the fixation rod 18 is fully reduced and the lock screw 990 is in position at the top of the receiver 12 awaiting engagement.

In use, once the bone anchors 10 have been properly seated and a fixation rod 18 is introduced through channel 928 of the guide assembly 900, the reduction instrument 950 is engaged to the guide assembly 900 as previously described and shown in FIGS. 44-45. At least one lock screw 990 is attached to the lock screw engagement feature 988 of the central shaft 960 before the reduction instrument 950 in engaged to the guide assembly 900. The translation knob 964 is operated in one direction, e.g., a clockwise direction, to advance the central shaft 960 in a distal direction such that the distal engagement end 986 contacts the fixation rod 18. At some point during this advancement, the lock screw 990 will come into contact with the top of the receiver 12. However, because the central shaft 960 (and thus the lock screw 990) is not rotating at this point, the lock screw 990 does not engage the guide and advancement feature 22 (FIG. 46) and advance into the receiver 12. However, the block portion 980 of the central shaft 960 continues to translate distally, advancing the engagement end 986 through the central aperture 996 of the lock screw 990 while the lock screw 990 remains stationary atop the receiver 12. The inner sleeve 972, which abuts the lock screw 990 and extends proximally therefrom also remains stationary during this time. The spring 968 allows this movement the of the engagement end 986 relative to the lock screw. The spring 968, which is positioned between the block portion 980 and the inner sleeve 972, compresses due to the transfer of translational energy from the block portion 980 to the spring 968. This continues until the fixation rod 18 is fully reduced within the receiver 12 of the bone anchor 10. For example, the fixation rod 18 may be fully reduced just before the fixation rod 18 bottoms out in the receiver 12. This prevents excessive loads on the reducer from over reduction. Though not shown, a stop may be provided to ensure reduction stops just prior to bottoming out. At this point the lock screw 990 is in position at top of the receiver 12 of the bone anchor 10, but the complementary guide and advancement features 22 are not yet engaged. To do so, the rotation knob 962 may be briefly rotated in a clockwise or counterclockwise direction to align the guide and advancement features 992 on the lock screw 990 and receiver 12. Though not necessary, an audible "click" may be heard, indicating that the guide and advancement features 22 have initially mated and are ready for full installation. The rotation knob 962 is then rotated in a clockwise direction. When the lock screw 990 is fully seated, the rotation knob 962 will cease to rotate.

The guide assembly 900 and the reduction instrument 950 may be used in alternative to the derotation tower 200 and derotation may be performed as previously discussed herein relative to FIGS. 1-39. However, another embodiment of the disclosure relates to another method for providing correction to an abnormal curvature of a spine which will now be discussed relative to the guide assembly 900 and reduction instrument 950 of system 170. This method can be used to correct an abnormal curvature of the spine caused by, but not limited, adolescent idiopathic scoliosis, pediatric scoliosis, degenerative scoliosis, and kyphosis. This method may also be used in cases where the spine has more than one abnormal curvature.

As shown in FIG. 46, the method may include providing a plurality of guide assemblies 900 coupled to bone anchors 10 within pedicles of a desired number of vertebrae. The method will now be described relative to first and second vertebral bodies (and guide assemblies 900 and reduction instruments 950 coupled thereto) merely for demonstration purposes. However, it is to be understood that the methods herein are equally applicable to more than two vertebral bodies at any number of desired levels of the spine. Specifically, the method includes providing a first guide assembly 900a coupled to a first bone anchor 10 positioned within a first pedicle of a first vertebra and providing a second guide assembly 900b is coupled to a second bone anchor 10 within a second pedicle of the first vertebra, i.e., the opposing pedicle on the same vertebra. Further, the method includes providing a third guide assembly 900c coupled to a first pedicle of a second vertebra and providing a fourth guide assembly 900d coupled to a second pedicle of the second vertebra. The second vertebra may be immediately adjacent to the first vertebra or in close proximity to the first vertebra on the same abnormal curvature as the first vertebra.

To position the guides assemblies 900, the guide assemblies 900 may be used with a screwdriver (not shown) according to known techniques to insert bone anchors 10 into the pedicles on opposing sides of the desired vertebrae. Specifically, multiple guide assemblies 900 may be used, each engaged with a respective bone anchor 10 as described herein, such that the channel 926 (FIG. 40) of the guide assembly 900 is aligned with the channel between the upright arms 14 (FIG. 46) of the bone anchor 10. A screwdriver may be inserted into the guide assembly 900 to drive the bone anchors 10 into the prepared respective pedicles. The screwdriver may be removed leaving a group of guide assemblies 900 in place on opposing sides of adjacent vertebrae of the desired number of vertebrae. The channels 928 of adjacent guide assemblies 900 on the same side of the spine should also be aligned with each other. More specifically, the method may include aligning a channel 928 of the first guide assembly 900a with a channel of the third guide assembly 900c. Further, the channels 928 of the second and fourth guide assemblies 900b, 900d may also be aligned.

Figure 48:
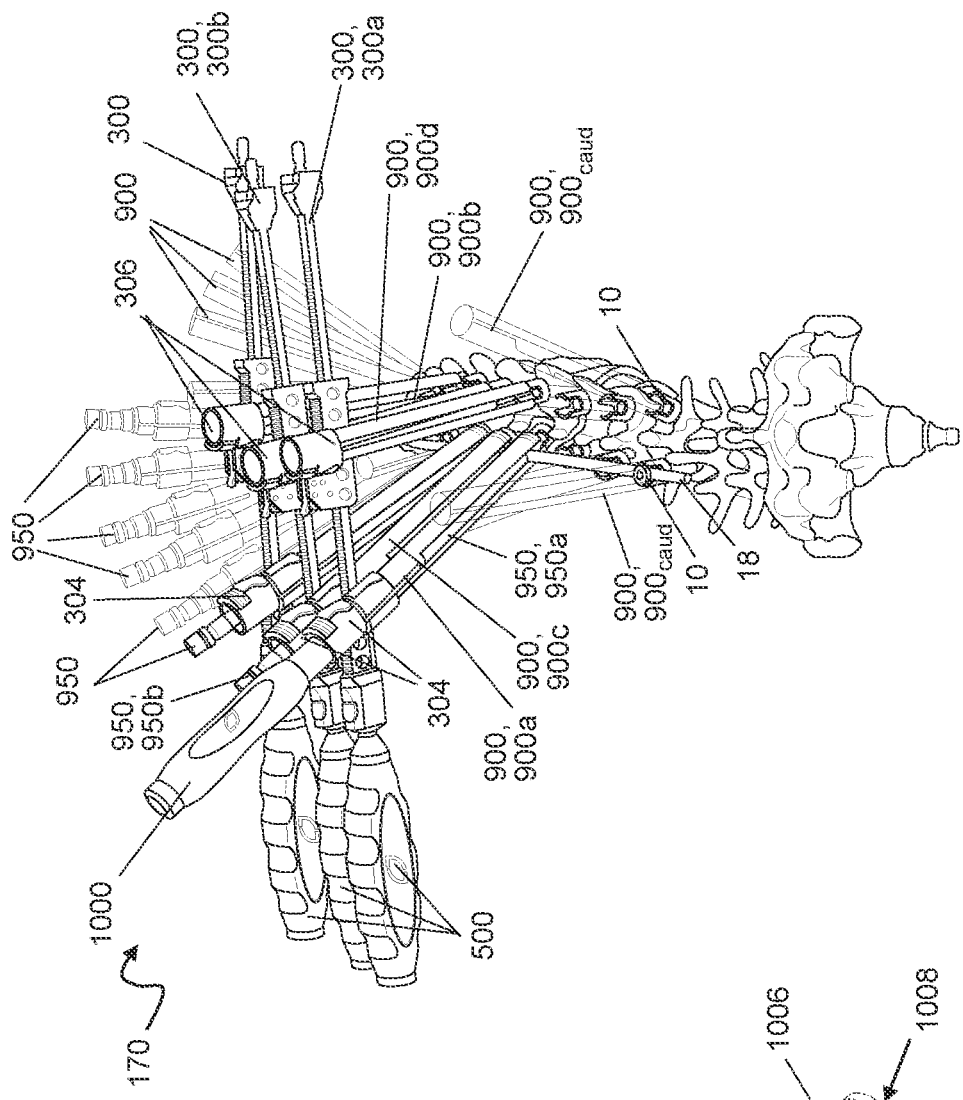
FIG. 48 shows a vertebral body derotation system on a spine having an abnormal curvature according to an embodiment of the disclosure.

The method may further include inserting a first fixation rod 18 through the channels 928 of the adjacent guide assemblies 900 on a first side of the spine. In some embodiments, the first fixation rod 18 may be inserted on a concavity of the abnormal curvature of the spine. In other embodiments, the first fixation rod 18 may be inserted on a convexity of the abnormal curvature of the spine. In yet another embodiment, first and second fixation rods 18 may be inserted on opposing sides of the abnormal curvature of the spine at this time. As shown in FIG. 48, a first fixation rod 18 is inserted within the aligned channels 928 (FIG. 40) of the first and third guide assemblies 900a, 900c on a first side of the spine.

Once the first fixation rod 18 is in the desired position relative to the guide assemblies 900, a reduction instrument 950 (not shown in FIG. 48) may be coupled with a guide assembly 900 on a neutrally rotated vertebra proximate the abnormal curvature as may be chosen by the user. In some situations, reduction instruments 950 can be inserted within guide assemblies 900 of the most caudal pair of guide assemblies $900_{caud}$ (shown in phantom) on the first side of the spine, i.e., the side that the first fixation rod 18 is inserted. Specifically, the reduction instrument 950 (FIGS. 42-46) can have a lock screw 990 (FIG. 48) coupled at lock screw engagement feature 988 (FIG. 42) and is inserted into the proximal end 910 of the most caudal guide assembly $900_{caud}$ and used to reduce the fixation rod 18 into the most caudal bone anchor 10 and provisionally lock the fixation rod 18 within the most caudal bone anchor 10 on the first side. When inserting the reduction instrument 950, the proximal end 910 (FIGS. 40-42) of the guide assembly $900_{caud}$ is received within the guide cavity 954 (FIGS. 37 and 39) and the ridges 958 (FIGS. 43 and 45) of the connector 952 (FIGS. 42-45) snap into the circumferential groove 922 (FIGS. 40-41) of the guide assembly $900_{caud}$. The reduction instrument 950 is used to reduce the first fixation rod 18 within the bone anchor 10 positioned most caudal to hold sagittal correction and deliver the lock screw 990 (FIG. 46) as discussed herein, e.g., using rotation knob 962 and translation knob 964, to provisionally hold the sagittal correction on the first side of the spine. To facilitate the rotation of the rotation knob 962 and the translation knob 964, the dual-sided handle 1000 (FIG. 47) may be optionally attached to the reduction instrument 950. Specifically, the second side 1006 of the dual sided handle 1000 that is configured to mate with the translation knob 964 may be used to reduce the first fixation rod 18. Subsequently, the dual-sided handle 1000 may be removed and flipped such that the first side 1002 of the dual sided handle 1000 may be engaged with the translation knob 964 to deliver the lock screw 990. The reduction instrument 950 may be removed from the most caudal guide assembly $900_{caud}$ on the first side leaving the guide assemblies $900_{caud}$ engaged with the most caudal bone anchors 10. At this point, the first fixation rod 18 should be floating within the remainder of the guide assemblies 900 including those positioned at about the abnormal curvature of the spine. This process may be repeated to insert a second fixation rod on the second side of the spine if desired. Alternatively, the second fixation rod can be inserted after manipulation of the vertebral bodies and locking of the first fixation rod 18. While described relative to the most caudal vertebra, it is to be understood that the user may choose another neutrally rotated vertebra proximate the abnormal curvature to perform these steps to hold sagittal correction. In cases where there are two abnormal curvatures about the spine, the user may choose a vertebra between the two abnormal curvatures.

The method further includes providing reduction instruments 950 within guide assemblies 900 positioned about the abnormal curvature of the spine on vertebrae positioned superior to the most caudal pair of guide assemblies $900_{caud}$. As will be described herein, the reduction instruments 950 are used 1) to correct the abnormal curvature of the spine in sagittal and coronal planes by reducing the fixation rod 18 within bone anchors 10, 2) to correct rotation of the spine in the axial plane by derotating desired vertebral bodies, and 3) to hold the sagittal, coronal and axial correction of the spine by delivering lock screws to lock the fixation rod 18 within the bone anchors 10. That is, the reduction instruments 950 positioned within respective guide assemblies 900 allow for three-dimensional spinal correction without the need for disconnecting and reconnecting instruments to perform each of 1) rod reduction, 2) vertebral body derotation and/or manipulation of the position of the vertebral body, and 3) locking of the fixation rod.

Specifically, a first reduction instrument 950a is provided within a first guide assembly 900a coupled to the first bone anchor 10 within the first vertebra. The first reduction instrument 950a has a first lock screw 990 (FIG. 46) coupled at a distal end of the first reduction instrument 950a when it is provided within the first guide assembly 900a. A second reduction instrument 900b is provided within the third guide assembly 900c within the second vertebra adjacent to the first guide assembly 900a. The second reduction instrument 950b has a second lock screw 990 (FIG. 46) coupled at a distal end of the second reduction instrument 950b when it is provided within the third guide assembly 900b. Next, a first transverse coupler 300a may be used to couple the first and second guide assemblies 900a, 900b across the first vertebra and a second transverse coupler 300b may be used to couple the third and further guide assemblies 900c, 900d across the second vertebra. The first transverse coupler 300a can be coupled with the first reduction instrument 950a positioned within the first guide assembly 900z and the second guide assembly 900b across the first vertebral body. The second transverse coupler 300b may also be coupled with the second reduction instrument 950b positioned within the third guide assembly 900c and the fourth guide assembly 900d across the second vertebral body. If a second fixation rod (not shown) has been inserted within the guide assemblies 900b, 900d on the other side of the spine, then third and fourth reduction instruments 950 may be provided within the second and fourth guide assemblies 900b, 900d prior to coupling of the transverse couplers 300a, 300b. In this case, the transverse couplers 300a, 300b may couple with the third and fourth reduction instruments 950 positioned within the second and fourth guide assemblies 900b, 900d. Further, while the method is being described relative to first and second vertebra, it is to be understood that reduction instruments 950 may be inserted within guide assemblies 900 positioned at any number of levels of the spine, and thus, additionally transverse couplers 300 may be used to link across desired vertebral levels. In some examples, it may be desirable to use transverse couplers 300 to couple instruments on opposing sides of the spine on all apical levels of the abnormal curvature. The transverse couplers 300a, 300b are coupled such that the spring-loaded pawl lock 326 of each coupler 304, 306 engages with the respective circumferential grooves 922 of the guide assemblies 900 or circumferential grooves 963 of the reduction instruments 950 depending on which instrument the transverse couplers 300a, 300b are coupling to.

As shown in FIG. 48, the transverse couplers 300a, 300b are coupled such that the proximal ends of the first and second reduction instruments 950a, 950b extend through respective couplers 304, 306 and can be accessed for engagement by the dual-sided handle 1000 which facilitates reduction of the fixation rod 18 and locking of the lock screw 990. If third and fourth reduction instruments 950 are also provided within second and fourth guide assemblies 900b, 900d, then the proximal ends of those reduction instruments 950 would also extend through respective couplers 304, 306. While it is shown that stationary couplers 304 of each transverse coupler 300 are positioned on the same of the page with FIG. 48, it should be understood that the stationary and adjustable couplers 304, 306 can be oriented in either direction and in some cases, each transverse coupler 300 may be oriented differently from the next such that the stationary coupler 304 of one transverse coupler 300 may be on an opposite side of the spine relative to another stationary coupler 304 of another transverse coupler 300. Further, manipulating components 500 may be optionally attached to attachment means 316 (FIGS. 14-15 and 18) of one or more transverse couplers 300 as may be desired. Further, while the method is being described relative to first and second transverse couplers 300a, 300b across first and second vertebral bodies, it is to be understood that the construct may be configured on any number of levels of the spine.

Next, one or more dual-sided handle(s) 1000 may be engaged with and/or coupled to the reduction instruments 950 positioned within guide assemblies 900 and transverse couplers 300. FIG. 48 shows the handle 1000 coupled with the first reduction instrument 950a. Specifically, the proximal end of the first reduction instrument 950a may be engaged with internal recess 1008 that is configured to mate with the translation knob 964 (FIGS. 42-45) of the first reduction instrument 950a. While not shown, another dual-sided handle 1000 may be coupled with the second reduction instrument 950b and any number of desired reduction instruments 950 positioned within guide assemblies 900, including reduction instruments 950 that may be positioned within guide assemblies 900b, 900d. At this point, the method may proceed in several ways.

In one example, the user may simultaneously reduce the first fixation rod 18 within the first bone anchor 10 and manipulate the first transverse coupler 300a to correct alignment of the first vertebral body. In this example, reduction of the fixation rod 18 and manipulation/repositioning of the vertebral body may be performed at the same level. The user may rotate the dual-sided handle 1000 to cause translation of the central shaft 960 (FIGS. 42-43) to reduce the fixation rod 18 within the bone anchor 10 while also maneuvering and/or manipulating the first transverse coupler 300a. The user can grasp any portion of the first transverse coupler 300a (including optional manipulating component 500 attached thereto, if used) or the guide assemblies 900a, 900b to cause maneuvering and/or manipulation of the transverse coupler 300a which in turn translates to movement of the vertebral body through the first and second guide assemblies 900a, 900b coupled therebetween. This process may then be repeated for the second vertebral body. Specifically, the second reduction instrument 950b may be engaged with the internal recess 1008 of a dual-sided handle 1000 that is configured to mate with the translation knob 964 of the second reduction instrument 900b. Next, the user may then simultaneously reduce the first fixation rod 18 within the third bone anchor 10 and manipulate the second transverse coupler 300b to correct alignment of the second vertebral body in the same way. This may be repeated for any subsequent vertebral body along the abnormal spinal curvature until alignment is corrected.

In another example, the user may simultaneously reduce the first fixation rod 18 within the first bone anchor 10 and manipulate at least the second transverse coupler 300b to correct alignment of the first and second vertebral bodies. That is, while the handle 1000 is being rotated to translate the central shaft 960 of the first reduction instrument 950a to reduce the fixation rod 18 into the first bone anchor 10, the user may also maneuver and/or manipulate the second transverse coupler 300b, i.e., reduction of the fixation rod 18 may be performed at one spinal level while manipulation of the construct on another spinal level is performed. Where multiple constructs are positioned on additional levels of the spine, the method may also include simultaneously manipulating transverse couplers 300 on one or more additional levels of the spine in addition to the manipulation of the second transverse coupler 300b while the first fixation rod 18 is being reduced within the first bone anchor 10.

In yet another example, the user may sequentially (i.e., one after the other) reduce the first fixation rod 18 within the first bone anchor 10 and the third bone anchor 10 while manipulating the first and second transverse couplers 300a, 300b independently or together during the sequential reduction to correct alignment of the first and second vertebral bodies. This sequential reduction and simultaneous manipulation can also be performed on additional levels of the spine in addition to the first and second vertebral bodies.

In yet another example, where first and second fixation rods 18 have been inserted within guide assemblies 900 on both sides of the spine (e.g., first, second, third and fourth guides assemblies 900a, 900b, 900c, 900d), reduction of one fixation rod 18 within a bone anchor 10 at a first spinal level on one side of the spine can take place while reduction of the other fixation rod 18 within a bone anchor 10 at a second spinal level on the other side of the spine. Further, one user (e.g., surgeon or surgical technician) reduce the first fixation rod 18 on one side of the spine while another user (e.g., surgeon or surgical technician) is simultaneously locking the second fixation rod 18 on the other side or vice versa.

Regardless of the way in which reduction of the fixation rod and manipulation of the vertebral bodies are performed, the system 170 need not be linked in the cranial/caudal direction. This allows for additional freedom to move between manipulating a single level or multiple levels while simultaneously performing rod reduction on one or more levels (and vice versa) quickly as may be desired. However, if the user wishes, the clamp 400 (FIGS. 21-23) may also be used as described relative to FIGS. 1-27 to aid in moving a group of vertebral bodies together.

As shown in FIG. 49, once desired alignment of a single vertebral body or several vertebral bodies is achieved, the method also includes locking the first fixation rod 18 within the bone anchors 10. Specifically, the dual-sided handle(s) 1000 can be flipped and the proximal ends of the reduction instruments 950 are engaged with the internal recess 1004 (FIG. 47) of the handle 1000. The handle 1000 can then be rotated to cause rotation of the central shaft 960 (FIGS. 42-43) which in turn rotates the lock screw 990 (FIG. 46) to cause the lock screw 990 to engage with the guide and advancement mechanism 22 (FIG. 46) of the bone anchor 10 and lock the first fixation rod 18 within the bone anchor 10. The locking can also be performed in several different ways. In one example, the first reduction instrument 950a is used to lock the first fixation rod 18 within the first bone anchor 10 while at least one of the remainder of the levels of the abnormal curvature are undergoing rod reduction and manipulation, e.g., the second vertebral body. In another example, the locking of the first fixation rod 18 within the bone anchors 10 across all levels may be performed after all vertebral bodies are in alignment. Further, in yet another example, the method may include provisionally locking the first fixation rod 18 within one or more bone anchors 10 while continuing to reduce the first fixation rod 18 and manipulate the transverse couplers 300 at other levels, and when the desired correction is achieved, the user can finally lock the fixation rod 18 within the bone anchors 10.

As shown in FIG. 50, after the first fixation rod 18 is locked into all bone anchors 10 on the first side, the transverse couplers 300 may be removed and a second fixation rod 18 may be inserted through the channels 928 (FIGS. 30-31) of the guide assemblies 900 on the second side, e.g., guide assemblies 900b, 900d. Third and fourth reduction instruments 950 may be provided therein to reduce and lock the second fixation rod 18 within bone anchors 10 on the second side. In cases where the second fixation rod 18 was inserted at the same time as the first fixation rod 18, and third and fourth reduction instruments 950 were positioned within the guide assemblies 900b, 900d prior to coupling of the transverse couplers 300, the transverse couplers 300 do not need to be removed prior to performing rod reduction and locking.

As should be made clear, the methods for correcting an abnormal curvature of the spine as described herein allows for simultaneous reduction of the fixation rod(s) and manipulation of the instruments, and therefore, the vertebral bodies coupled thereto. Further, because the reduction instruments are loaded within the guide assemblies having a lock screw coupled to the distal end, the fixation rod can be quickly and easily locked within the respective bone anchors as alignment of the vertebral bodies is being achieved. Further, it should be understood that the use of guide assemblies and reduction instruments in this way allows for a number of different combinations of simultaneous reduction and manipulation being performed at the same and/or different levels of the abnormal curvature of the spine. It should be also understood that more than one user (e.g., a surgeon and surgical technician) may together perform the methods described herein to achieve the simultaneous reduction, manipulation, and locking. Further, while the method has been described relative to first and second vertebral bodies, it is to be understood that the reduction instruments may be inserted within guide assemblies positioned at any number of levels of the spine and various combinations of reducing the rod at one level while manipulating at another level can be performed.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The terminology used herein is for the purpose of describing particular embodiments only and is not intended to be limiting of the disclosure. As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. It will be further understood that the terms "comprises" and/or comprising," when used in this specification, specify the presence of stated features, integers, steps, operations, elements, and/or components, but do not preclude the presence or addition of one or more other features, integers, steps, operations, elements, components, and/or groups.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

What is claimed is:

1. A vertebral body derotation system comprising:
a first pair of derotation towers coupled to a first pair of bone anchors, each bone anchor of the first pair of bone anchors configured to be positioned on opposing sides of a first vertebral body;
a second pair of derotation towers coupled to a second pair of bone anchors, each bone anchor of the second pair of bone anchors configured to be positioned on opposing sides of a second vertebral body;
a first transverse coupler extending across the first vertebral body and coupled to each derotation tower of the first pair of derotation towers;
a second transverse coupler extending across the second vertebral body and coupled to each derotation tower of the second pair of derotation towers;
at least one clamp configured to couple the first and second transverse couplers in a cranial-caudal direction or a first derotation tower of the first pair of derotation towers and a second derotation tower of the second pair of derotation towers in the cranial-caudal direction; and
one or more actuation mechanisms, and
wherein one or more derotation towers of the first pair of derotation towers and the second pair of derotation towers is configured to transition between an unlocked position and a locked position via the one or more actuation mechanisms, and
wherein each derotation tower of the first pair and second pair of derotation towers includes:
an inner elongate member having a proximal end and a distal end, the distal end of the inner elongate member having a pair of opposing extensions separated by a channel; and
an attachment arm within each extension of the pair of opposing extensions of each inner elongate member, the attachment arm being configured to translate between the unlocked and locked position.

2. The vertebral body derotation system of claim 1, further comprising:
a rod reducer having a proximal end and a distal end, the proximal end of the rod reducer having an outer thread for threadingly engaging with an inner thread at a proximal end of at least one inner elongate member, wherein the rod reducer is configured to be inserted within the proximal end of the at least one inner elongate member and translated in a distal direction upon rotation of the rod reducer relative to the at least one inner elongate member to reduce a rod within a receiver of the bone anchor.

3. The vertebral body derotation system of claim 1, wherein the at least one clamp includes:
a first arm having a first end and a second end;
a second arm having a first end and a second end; and
a locking mechanism disposed on the second end of the first arm and the second end of the second arm to maintain the at least one clamp in a closed position,
wherein the first end of the first arm is pivotably coupled with the first end of the second arm such that the first and second arms can pivot between an open and closed position.

4. The vertebral body derotation system of claim 1, wherein the first transverse coupler includes:
a first shaft having a first end and a second end;
a first stationary coupler at the first end of the first shaft; and
a first adjustable coupler at the second end of the first shaft, the first adjustable coupler being moveable about the first shaft relative to the first stationary coupler, wherein the first stationary coupler and the first adjustable coupler are each configured to couple to a respective derotation tower of the first pair of derotation towers.

5. The vertebral body derotation system of claim 4, wherein an angular orientation of at least one of the first stationary coupler and the first adjustable coupler relative to the first shaft is configured to be adjusted.

6. The vertebral body derotation system of claim 1, further comprising:
an attachment assembly configured to slidingly engage a proximal end of a derotation tower of the first pair of derotation towers or the second pair of derotation towers, the attachment assembly including an attachment means for a manipulating component.

7. The vertebral body derotation system of claim 1, wherein each derotation tower of the first pair and second pair of derotation towers includes:
an inner elongate member having a proximal end and a distal end, the distal end of the inner elongate member having a pair of opposing extensions separated by a channel;
an actuation mechanism of the one or more actuation mechanisms disposed over the inner elongate member, the actuation mechanism including:
a base member configured to slide about the inner elongate member between an unlocked position and a locked position; and
a pair of pivoting arms, wherein each pivoting arm of the pair of pivoting arms includes a first portion being coupled with the base member and a second portion being coupled to the inner elongate member at a pivot point.

8. The vertebral body derotation system of claim 7, wherein each derotation tower of the first pair and second pair of derotation towers further includes:
an attachment arm within each extension of the pair of opposing extensions, the attachment arm being configured to translate between the unlocked and locked position.

9. The vertebral body derotation system of claim 8, wherein each pivoting arm is coupled to a respective attachment arm,
wherein the base member of the actuation mechanism is configured to slide distally during a transition from the unlocked position to the locked position such that the sliding of the base member causes each pivoting arms to pivot about the pivot point, wherein the attachment arm of each extension translates proximally upon the pivoting of the pivoting arms about the pivot point, and wherein a distal end of the attachment arm of each extension of the opposing extensions is configured to engage with opposing sides of a receiver of a respective bone anchor.

10. The vertebral body derotation system of claim 1, wherein each derotation tower of the first pair and second pair of derotation towers includes:

an inner elongate member having a proximal end and a distal end, the distal end of the inner elongate member having a pair of opposing extensions separated by a channel;

an attachment arm within each extension of the pair of opposing extensions of each inner elongate member, the attachment arm being configured to translate between the unlocked and locked position; and an actuation mechanism of the one or more actuation mechanisms disposed over the inner elongate member, the actuation mechanism including:

a base member configured to slide about the inner elongate member between an unlocked position and a locked position; and a pair of pivoting arm assemblies, wherein each pivoting arm assembly of the pair of pivoting arm assemblies includes a distal pivoting arm and a proximal pivoting arm pivotably coupled together.

11. The vertebral body derotation system of claim 10, wherein each pivoting arm assembly is coupled to a respective attachment arm of each opposing extension, and wherein the base member of the actuation mechanism is configured to slide distally during a transition from the unlocked position to the locked position such that the sliding of the base member causes pivoting arm assemblies to pivot thereby causing the attachment arm of each extension to translate proximally.

12. The vertebral body derotation system of claim 11, wherein a distal end of the attachment arm of each extension of the opposing extensions is configured to engage with opposing sides of a receiver of a respective bone anchor.

13. A method for providing correction to an abnormal curvature of a spine, the method comprising:

providing a first reduction instrument within a first guide assembly, the first guide assembly being coupled to a first bone anchor fixed within a first vertebra; and using the first reduction instrument being coupled with the first guide assembly and first bone anchor to:

correct curvature of the spine in sagittal and coronal planes by reducing a first fixation rod within the first bone anchor, correct rotation of the spine in an axial plane by derotating the first vertebra, and hold sagittal, coronal, and axial correction of the spine by delivering a lock screw to lock the first fixation rod within the first bone anchor;

providing a second reduction instrument within a second guide assembly, the second guide assembly being coupled with a second bone anchor positioned within a second pedicle of the first vertebra; and coupling a first transverse coupler with the first reduction instrument within the first guide assembly and with the second guide assembly.

14. The method of claim 13, wherein the providing of the first reduction instrument includes providing the first reduction instrument with a first lock screw coupled to a distal end of the first reduction instrument.

15. The method of claim 13, further comprising:

coupling a first side of a handle with a translation knob of the first reduction instrument to cause reduction of the first fixation rod within the first bone anchor; and coupling a second side of the handle with a rotation knob of the first reduction instrument to cause locking of the first fixation rod within the first bone anchor.

16. The method of claim 13, further comprising:

coupling a third guide assembly to a third bone anchor positioned within a first pedicle of a second vertebra and coupling a fourth guide assembly to a fourth bone anchor positioned within a second pedicle of the second vertebra;

providing a second reduction instrument within the third guide assembly; and coupling a second transverse coupler with the second reduction instrument within the third guide assembly and with the fourth guide assembly.

17. The method of claim 16, further comprising:

simultaneously reducing the first fixation rod within the first bone anchor and manipulating the first transverse coupler to correct alignment of the first vertebra; and simultaneously reducing the first fixation rod within the third bone anchor and manipulating the second transverse coupler to correct alignment of the second vertebra.

18. The method of claim 16, further comprising:

sequentially reducing the first fixation rod within the first bone anchor and the third bone anchor; and during the sequentially reducing of the first fixation rod, manipulating the first and second transverse couplers to correct alignment of the first and second vertebra.

* * * * *